US009729586B2

(12) United States Patent
Brewer et al.

(10) Patent No.: US 9,729,586 B2
(45) Date of Patent: Aug. 8, 2017

(54) AUTO-DIALER DETECTOR FOR INTER-CARRIER NETWORK SWITCH

(71) Applicant: PEERLESS NETWORK, INC., Chicago, IL (US)

(72) Inventors: James E. Brewer, Chicago, IL (US); Jeffrey S. Wall, Dallas, TX (US)

(73) Assignee: PEERLESS NETWORKS, INC., Chicago, IL (US)

( * ) Notice: Subject to any disclaimer, the term of this patent is extended or adjusted under 35 U.S.C. 154(b) by 112 days.

(21) Appl. No.: 14/543,486

(22) Filed: Nov. 17, 2014

(65) Prior Publication Data
US 2016/0036991 A1    Feb. 4, 2016

Related U.S. Application Data

(60) Provisional application No. 62/030,873, filed on Jul. 30, 2014.

(51) Int. Cl.
*H04Q 3/62* (2006.01)
*H04M 3/38* (2006.01)
(Continued)

(52) U.S. Cl.
CPC ...... *H04L 65/1076* (2013.01); *H04L 65/1053* (2013.01); *H04M 3/2218* (2013.01);
(Continued)

(58) Field of Classification Search
CPC ... H04L 12/585; H04L 51/12; H04L 63/0236; H04L 63/0254; H04L 63/1408;
(Continued)

(56) References Cited

U.S. PATENT DOCUMENTS 5,991,367 A * 11/1999 Robuck ............... H04M 1/663
                                                    379/196
6,330,317 B1 * 12/2001 Garfinkel ............ H04M 3/436
                                                    379/196
(Continued)

OTHER PUBLICATIONS

Nolan et al., Nuisance Level of a Voice Call, Publication date: Oct. 2008, ACM Transactions on Multimedia Computing, Communications and Applications, vol. 5, No. 1, Article 6.*
(Continued)

*Primary Examiner* — Michael Thier
*Assistant Examiner* — Eric Nowlin
(74) *Attorney, Agent, or Firm* — Marshall, Gerstein & Borun LLP; Randall G. Rueth

(57) ABSTRACT

To maximize efficiencies and to reduce termination costs of inter-carrier exchanges, an auto-dialer detection system enables an inter-carrier network switch to detect, in real-time or in near real-time, calls that are originated by auto-dialers. A call router of the switch may receive an incoming call attempt that includes a particular Automatic Number Identification (ANI). The auto-dialer detection system allows for a real-time or near-real time determination, based on the ANI and contents of a cache during a sliding window of time coincident with the reception of the origination, whether or not the call should be routed through the switch. Further, the auto-dialer detection system provides a real-time or a near real-time update to the cache contents to enable further real-time or near-real time detection and blocking of auto-dialed calls. Overrides to the cache (e.g., to always allow and/or to always block calls that include certain ANIs) may be provided.

23 Claims, 16 Drawing Sheets

(51) Int. Cl.
  *H04Q 3/66* (2006.01)
  *H04L 29/06* (2006.01)
  *H04M 3/32* (2006.01)
  *H04M 3/22* (2006.01)
  *H04M 7/12* (2006.01)
  *H04M 15/00* (2006.01)
  *H04M 3/42* (2006.01)

(52) U.S. Cl.
  CPC ........... *H04M 3/2281* (2013.01); *H04M 3/38* (2013.01); *H04M 3/42238* (2013.01); *H04M 3/42314* (2013.01); *H04M 7/123* (2013.01); *H04M 7/1275* (2013.01); *H04M 7/1285* (2013.01); *H04M 15/50* (2013.01); *H04M 15/8228* (2013.01); *H04M 15/881* (2013.01); *H04Q 3/62* (2013.01); *H04Q 3/66* (2013.01)

(58) Field of Classification Search
  CPC ............. H04L 63/1441; H04L 63/1466; H04L 67/306; H04L 65/1076; H04L 65/1053; H04L 1/0045; H04L 12/5815; H04L 51/32; H04L 63/1425; H04L 63/145; H04L 51/5815; H04L 63/105; H04W 12/12; H04W 4/12; H04W 4/14; H04W 4/16; H04M 3/2218; H04M 3/2281; H04M 3/38; H04M 3/42238; H04M 3/42314; H04M 7/123; H04M 7/1275; H04M 7/1285; H04M 15/50; H04M 15/8228; H04M 15/881; H04M 1/663; H04M 3/436; H04M 3/4365; H04M 3/42042; H04M 3/42059; H04M 15/41; H04M 2203/6027; H04Q 3/62; H04Q 3/66
  See application file for complete search history.

(56) References Cited

U.S. PATENT DOCUMENTS

| | | | | |
|---|---|---|---|---|
| 6,353,663 | B1 * | 3/2002 | Stevens | H04M 15/00 379/111 |
| 7,020,259 | B2 * | 3/2006 | Hussain | H04M 3/42153 379/207.02 |
| 7,212,620 | B1 * | 5/2007 | Mastro | H04M 1/57 379/134 |
| 7,231,029 | B1 * | 6/2007 | Kirkpatrick | H04M 3/436 379/210.02 |
| 7,295,660 | B1 * | 11/2007 | Higginbotham | H04M 3/436 379/196 |
| 7,315,518 | B1 * | 1/2008 | Siegrist | H04L 12/66 370/259 |
| 7,412,049 | B1 * | 8/2008 | Koch | H04M 3/436 379/195 |
| 7,626,929 | B2 | 12/2009 | Mallesan | |
| 7,684,317 | B2 | 3/2010 | March et al. | |
| 7,725,708 | B2 | 5/2010 | Wu et al. | |
| 7,797,379 | B2 * | 9/2010 | Hawkins | H04L 12/585 370/229 |
| 7,940,654 | B2 | 5/2011 | March et al. | |
| 8,036,689 | B2 * | 10/2011 | van As | H04W 4/12 370/312 |
| 8,085,758 | B2 | 12/2011 | Ramachandran et al. | |
| 8,089,900 | B2 * | 1/2012 | Bozionek | H04L 51/12 370/252 |
| 8,243,909 | B2 * | 8/2012 | Wood | H04M 3/436 379/142.06 |
| 8,249,232 | B2 * | 8/2012 | Fotta | H04L 51/12 379/196 |
| 8,363,803 | B2 * | 1/2013 | Gupta | H04M 3/4365 379/142.02 |
| 8,416,938 | B2 * | 4/2013 | Wood | H04M 3/436 379/142.06 |
| 8,488,479 | B2 * | 7/2013 | Li | H04L 65/1079 370/252 |
| 8,509,413 | B2 * | 8/2013 | Holtel | H04L 12/2827 379/201.01 |
| 8,522,344 | B2 * | 8/2013 | Ormazabal | H04L 63/107 726/22 |
| 8,548,149 | B2 * | 10/2013 | Czachor, Jr. | H04M 3/436 379/210.02 |
| 8,570,588 | B2 | 10/2013 | Edgar et al. | |
| 8,630,393 | B2 | 1/2014 | Baril et al. | |
| 8,634,520 | B1 | 1/2014 | Morrison et al. | |
| 8,671,020 | B1 * | 3/2014 | Morrison | H04M 15/70 379/112.01 |
| 8,687,782 | B1 * | 4/2014 | Ismail | G06Q 30/0247 379/112.01 |
| 8,755,371 | B2 | 6/2014 | Ramachandran et al. | |
| 8,787,549 | B2 * | 7/2014 | Wood | H04M 3/436 379/142.06 |
| 9,014,359 | B1 * | 4/2015 | Pfeffer | H04M 3/436 379/142.02 |
| 9,154,597 | B2 * | 10/2015 | Cook | H04M 1/663 |
| 9,516,163 | B2 * | 12/2016 | Hickey | H04M 3/436 |
| 9,553,985 | B2 * | 1/2017 | Cohen | H04M 3/4365 |
| 2003/0152198 | A1 * | 8/2003 | Price | H04M 1/663 379/67.1 |
| 2004/0131164 | A1 * | 7/2004 | Gould | H04M 1/647 379/88.19 |
| 2004/0198454 | A1 * | 10/2004 | Chavez | H04M 3/38 455/565 |
| 2004/0213396 | A1 * | 10/2004 | MacNamara | H04M 3/436 379/210.02 |
| 2004/0264663 | A1 * | 12/2004 | Enzmann | H04M 1/57 379/142.06 |
| 2005/0053215 | A1 * | 3/2005 | Bedingfield | H04M 3/2281 379/210.02 |
| 2005/0226151 | A1 * | 10/2005 | Fotta | H04L 51/12 370/230 |
| 2005/0259667 | A1 * | 11/2005 | Vinokurov | H04L 12/585 370/401 |
| 2006/0147014 | A1 * | 7/2006 | Smith | H04M 3/436 379/210.02 |
| 2007/0019563 | A1 | 1/2007 | Ramachandran et al. | |
| 2007/0143422 | A1 * | 6/2007 | Cai | H04M 3/436 709/206 |
| 2009/0007220 | A1 * | 1/2009 | Ormazabal | H04L 63/107 726/1 |
| 2009/0034527 | A1 * | 2/2009 | Mathieu | H04L 29/06027 370/392 |
| 2010/0034121 | A1 * | 2/2010 | Bozionek | H04L 51/12 370/259 |
| 2010/0149981 | A1 * | 6/2010 | Kimble | H04M 3/22 370/235 |
| 2010/0182945 | A1 * | 7/2010 | van As | H04W 4/12 370/312 |
| 2010/0278325 | A1 * | 11/2010 | Singh | H04M 3/436 379/210.02 |
| 2011/0116615 | A1 * | 5/2011 | Holtel | H04L 12/2827 379/201.02 |
| 2011/0294478 | A1 * | 12/2011 | Trivi | H04M 3/436 455/415 |
| 2012/0027191 | A1 * | 2/2012 | Baril | H04M 3/436 379/210.02 |
| 2012/0128144 | A1 * | 5/2012 | Chislett | H04L 65/1079 379/201.01 |
| 2012/0263282 | A1 * | 10/2012 | Wood | H04M 3/4365 379/88.16 |
| 2012/0309365 | A1 * | 12/2012 | Wang | H04M 3/436 455/414.1 |
| 2012/0321064 | A1 * | 12/2012 | Czachor, Jr. | H04M 3/436 379/210.02 |
| 2013/0022187 | A1 * | 1/2013 | Velusamy | H04M 3/38 379/142.02 |
| 2013/0195257 | A1 * | 8/2013 | Wood | H04M 3/4365 379/67.1 |

(56) References Cited

U.S. PATENT DOCUMENTS

| | | | |
|---|---|---|---|
| 2014/0105373 A1 | 4/2014 | Sharpe | |
| 2014/0119527 A1* | 5/2014 | Cohen ................ | H04M 3/4365 |
| | | | 379/207.13 |
| 2014/0120885 A1* | 5/2014 | Luneau ............... | H04M 3/2281 |
| | | | 455/414.1 |
| 2015/0003600 A1* | 1/2015 | Bucko ................. | H04M 3/436 |
| | | | 379/210.02 |
| 2015/0189082 A1* | 7/2015 | Pfeffer ................ | H04M 3/436 |
| | | | 379/142.09 |
| 2016/0142540 A1* | 5/2016 | Hickey .............. | H04M 3/42059 |
| | | | 379/210.02 |
| 2016/0277573 A1* | 9/2016 | Farrand .............. | H04M 3/436 |
| 2016/0337495 A1* | 11/2016 | Akita ................. | H04M 1/663 |
| 2016/0360036 A1* | 12/2016 | Ansari ................ | H04M 3/436 |
| 2017/0064076 A1* | 3/2017 | Hayakawa ........... | H04M 3/436 |
| 2017/0134575 A1* | 5/2017 | Quilici ............... | H04M 3/436 |

OTHER PUBLICATIONS

FCC, Robocall Strike Force Report, Oct. 26, 2016, FCC, https://www.fcc.gov/news-events/events/2016/10/second-meeting-industry-led-robocall-strike-force (accessed Feb. 14, 2017).*

* cited by examiner

AUTO-DIALER DETECTOR FOR INTER-CARRIER NETWORK SWITCH

CROSS-REFERENCE TO RELATED APPLICATIONS

This is a non-provisional patent application that claims priority to and the benefit of the filing date of U.S. Provisional Patent Application No. 62/030,873 entitled "Efficient Private Inter-Carrier Network Switching" and filed on Jul. 30, 2014, the disclosure of which is hereby incorporated by reference in its entirety. Additionally, the present disclosure hereby incorporates by reference, in its entirety, U.S. patent application Ser. No. 12/469,454 filed May 20, 2009 and entitled "System and Method of Providing Communication Service Using a Private Packet Network Backbone Exchange" which issued on Oct. 9, 2012 as U.S. Pat. No. 8,284,765.

TECHNICAL FIELD

The following disclosure relates to systems and methods for providing efficiencies in inter-carrier network switching, and in particular, for detecting, at an inter-carrier network switch or exchange in real-time or in near real-time, calls originated by an automatic dialer. The inter-carrier network switch or exchange may use a private packet network backbone switch or exchange.

BACKGROUND

In today's telephony and communication networks, inter-carrier switches or networks provide connections between various networks corresponding to various communications carriers. Long distance termination providers, for example, may utilize an inter-carrier switch to provide connections between carriers corresponding to calling parties and various other interconnected carriers corresponding to called parties. In such cases, the inter-carrier network connects to multiple exchanges for completing calls to a calling party provider, which exchanges may allow the inter-carrier network to employ various termination routes, for example, based on cost and/or other criteria.

Vendors operating the multiple exchanges connected to an inter-carrier network may assess a variety of surcharges based on certain performance metrics associated with the inter-carrier network. Often, vendors operating exchanges charge inter-carrier networks fees based on a number or percentage of "short" or "short-duration" calls (i.e., calls lasting for a time less than a certain threshold), or based on a number or percentage of calls to unallocated, or otherwise invalid, phone numbers, that have been routed to the exchanges from the inter-carrier network. As such, the routing of many short calls and/or the routing of many calls to unallocated numbers via an inter-carrier network can be very costly.

Further, certain inter-carrier networks or portions of an inter-carrier network may be optimized for certain types of traffic. Certain portions of an inter-carrier network can utilize components (e.g., soft switches, call routers, etc.) and connections to exchanges that are optimized for or devoted to "conversational" traffic, such as calls between two human beings. Other portions of the inter-carrier network can utilize components and connections to exchanges that are optimized for or devoted to automated dialer traffic. However, it is difficult for an operator of an inter-carrier network to accurately segment customers into such categories and/or enforce policies related to such differences in call traffic, as connecting carriers may misrepresent or be unaware of the actual characteristics of the traffic traversing corresponding exchanges.

Additionally, as typical inter-carrier networks are connected to a variety of carrier exchanges with varying performances, some operators of inter-carrier networks may attempt to route calls based on the performance quality of candidate terminating carrier exchanges. Yet, determining up-to-date, real-time or near real-time performance characteristics of carrier exchanges may be challenging. Often, adjustments to the routing of traffic from an inter-carrier network to a selected exchange are based on average or historical values of metrics that are obtained manually over relatively lengthy periods of time, so that the inter-carrier network is not able to accommodate intermittent and/or shorter duration issues, such as looping or temporary decreases in capacity.

SUMMARY OF THE DISCLOSURE

In an embodiment, a method for detecting incoming calls originated by an auto dialer may include receiving, at a call router of an inter-carrier network switch or exchange, an indication of an incoming call that has been received at the inter-carrier network switch or exchange. The incoming call may include an Automatic Number Identification (ANI). Based on the reception of the call, the method may include causing an indication of a call attempt corresponding to the ANI to be stored in a cache or local memory. Further, the method may include determining whether to allow or to deny the incoming call at the switch based on the contents of the cache. When an incoming call is determined to be allowed, the method may include processing the incoming call through a Private Packet Network Backbone Exchange (PPNBE) of the inter-carrier network switch to a terminating exchange, and causing a corresponding call data record (CDR) to be stored in a CDR data storage device that is communicatively connected to the inter-carrier network switch. When the incoming call is determined to be denied, the method may include not processing the incoming call through the PPNBE to any terminating exchange.

In an embodiment, an auto-dialer detector may include a communicative connection to a call router included in an inter-carrier network switch or exchange. The auto-dialer detector may further include a set of computer-readable instructions that are stored on one or more non-transitory, tangible computer-readable storage media. The set of instructions, when executed by one or more processors, may cause the auto-dialer detector to receive, via the communicative connection to the call router, an indication that a call attempt has been received at the inter-carrier network switch. The call attempt may include an indication of a particular Automatic Number Identification (ANI). The instructions may further cause the auto-dialer detector to determine, based on the particular ANI and the contents of a cache or local memory, whether to allow or to deny further routing of the call using the inter-carrier network switch. For example, the determination may be made by using a real-time or a near real-time analysis of the contents of the cache. When the routing of the call attempt is determined to be allowed, the instructions may further cause the auto-dialer detector to provide, to the call router, an allow indication indicating that the call attempt is to be processed through a Private Packet Network Backbone Exchange (PPNBE) of the inter-carrier network switch to a terminating exchange, and thereby causing a call data record (CDR) for the call attempt to be stored in a call data record data storage entity that is communicatively connected to the inter-carrier network switch. When the processing of a call attempt is determined to be denied, the instructions may further cause the auto-dialer detector to provide, to the call router, a deny indication indicating that the call attempt is not to be processed through the PPNBE of the inter-carrier network switch to any terminating exchange. Additionally, the instructions may further cause the auto-dialer detector to update, e.g., in real-time or in near real-time, the contents of the cache in response to the reception of the indication of the call attempt indicating the particular ANI.

In an embodiment, a system for detecting auto-dialed calls may include a cache or locally accessible memory configured to store an indication of a respective number of call attempts for each of one or more Automatic Number Identifications (ANIs) included in one or more calls that are received at an inter-carrier network switch during a sliding window of time. The inter-carrier network switch may include a Private Packet Network Backbone Exchange (PP-NBE) through which incoming calls may be processed to one or more terminating exchanges. In addition, the sliding window of time may have an end time that is a current time (e.g., a point in time that is concurrent with a time at which an indication of a call attempt is received). Additionally, the system may include an auto-dialer detector that is configured to update the indications of the respective numbers of call attempts for the one or more ANIs. Further, the system may include a call router included in the inter-carrier exchange switch, where the call router is configured to process calls using the PPNBE and based on a real-time analysis of the contents of the cache.

DETAILED DESCRIPTION

Figure 1:
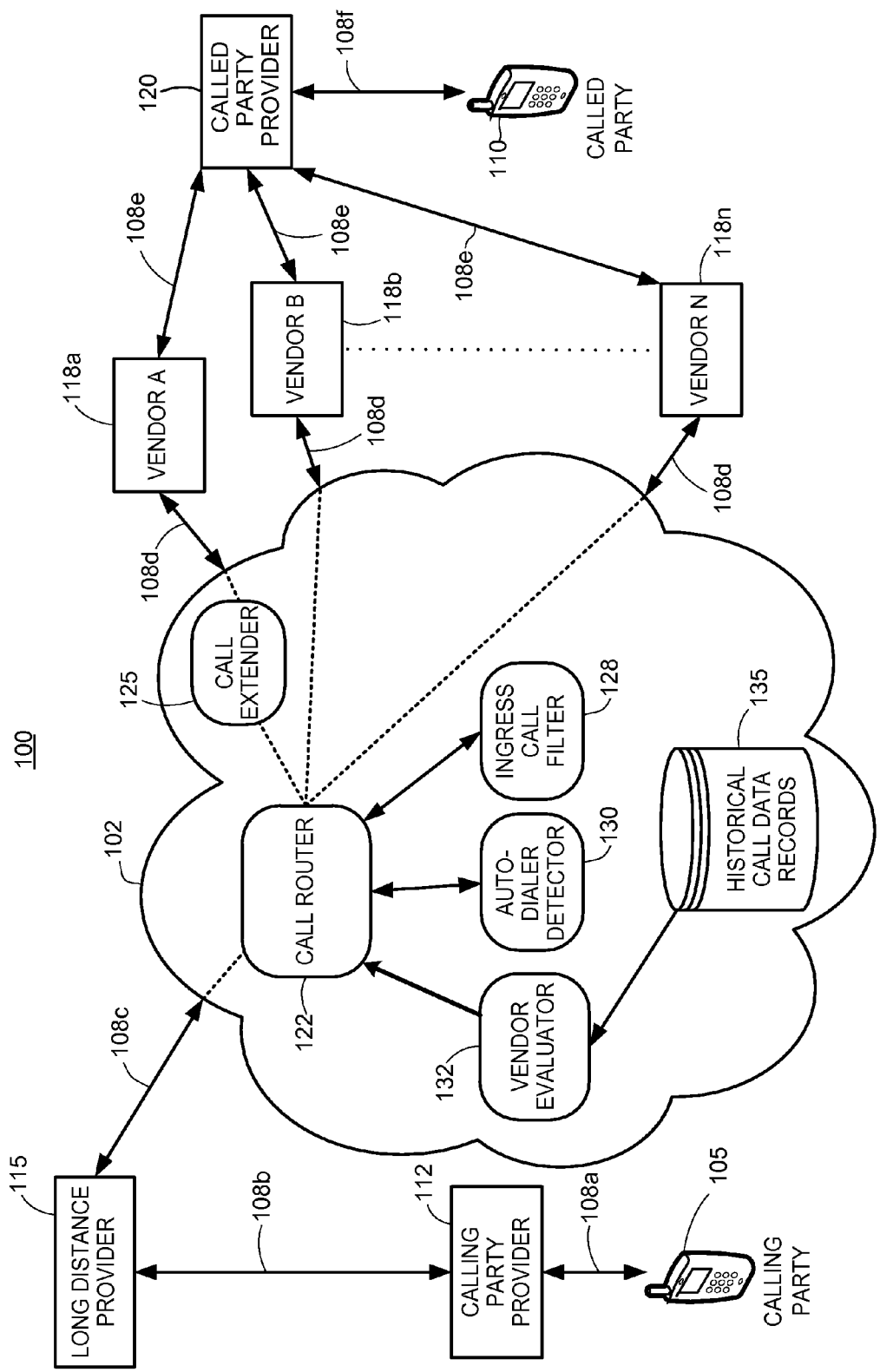
FIG. 1 depicts an embodiment of a communication system that supports efficient, inter-carrier switching.

FIG. 1 illustrates a block diagram of an embodiment of a communication system 100 that supports inter-carrier switching. The system 100 may include an inter-carrier switch 102 (also interchangeably referred to herein as an exchange, switching exchange, or network 102). A calling party 105 may originate a voice or data call 108 that is destined for a called party 110. The originating call may be initially serviced (as indicated by the reference 108a) by a last-mile switch, system, exchange or network 112 (referred to as a "calling party provider" 112 herein) of the communications service provider or carrier of the calling party 105. In the example scenario shown in FIG. 1, the call 108 is a long-distance call, and as such, the calling provider service provider network 112 may connect with a long distance provider or carrier network 115 to deliver the call (reference 108b), and the long distance provider network 115 may connect with the inter-carrier exchange 102 to continue delivery of the call (reference 108c) towards the called party 110.

The inter-carrier exchange 102 may be connected to multiple vendor switches, systems, networks or exchanges 118a-118n (e.g., generally referred to herein as "vendors" or "exchanges" 118a-118n), each of which may provide subsequent connectivity towards the called party 110, and at least some of which may be provided by different communication vendors, service providers, or carriers. A call router 122 of the inter-carrier exchange 102 may receive the originating call (reference 108c), select one of the vendors or carriers 118a-118n, and connect the call 108 to the selected vendor network 118a-118n (e.g., via selected routes represented by dashed lines within the switch 102 and reference 108d). In an embodiment, the call router 122 may select or determine the outgoing or terminating vendor 118a-118n based on least cost routing (LCR), and/or based on other desired criteria. In the example scenario shown in FIG. 1, each vendor exchange or network 118a-118n may connect to a last-mile switch, system, exchange or network 120 of a communications service provider or carrier of the called party 110. Accordingly, the selected vendor 118a-118n may connect the call 108 to the exchange 120 of the last-mile service provider of the called party (reference 108e), and the last-mile provider 120 of the called party 110 may complete the call 108 to the device of the called party 110 (as indicated by reference 108f).

As such, the exchange, provider, or network immediately preceding the inter-carrier network switch or exchange 102 in the call scenario may be a customer of the inter-carrier network switch or exchange 102, as the immediately preceding exchange, provider, or network may rely on or request the inter-carrier network switch or exchange 102 to route or forward a call on behalf of the immediately preceding network, e.g., by utilizing least cost routing and/or some other criteria. For example, in the call scenario depicted in FIG. 1, the long distance provider 115 is a customer of the inter-carrier network switch or exchange 102. In some arrangements, the inter-carrier network switch or exchange 102 may service multiple different customers (not shown), and may route calls on their behalf.

It is noted that the call scenario shown in FIG. 1 is exemplary only, and the communications system 100 (and the inter-carrier switch 102 in particular) may support other types of call scenarios. For example, in some scenarios, the call 108 may not be a long distance call, and thus the long-distance termination provider network 115 may be omitted from servicing the call 108. In some scenarios, each vendor 118a-118n may provide last-mile connectivity directly to the called party device 110, and thus the called party provider network 102 may be omitted from servicing the call 108. In some scenarios, one or more tandem exchanges or networks (not shown) may service the call 108 prior to its entry into the inter-carrier network 102 and/or after its exit from the inter-carrier network 102.

Generally, any of the exchanges 112, 115, 118a-118n, 120 other than the inter-carrier network exchange 102 may be a private exchange or network, or may be a public exchange or network. Furthermore, any of the exchanges 112, 115, 118a-118n and 120 other than the inter-carrier network exchange 102 may be a data network and/or may be a communications network. For example, one or more of the exchanges 112, 115, 118a-118n, 120 may be included in the PSTN (Public Switched Telephone Network), or one or more of the exchanges 112, 115, 118a-118n, 120 may be a data network, and/or may include the Internet.

On the other hand, the inter-carrier network exchange 102 may be a private exchange. For example, the inter-carrier network exchange 102 may be a private packet network backbone exchange (PPNBE). A PPNBE may serve as a single logical switch for providing "one-hop" routing between carriers, and may include a private Internet Protocol (IP) backbone or network comprising privately managed nodes via which packet call traffic may be routed. Such a private network backbone does not include the public Internet and is privately managed, and consequently, the number of nodes and routing priorities of packets within the network exchange may be engineered and controlled to maximize call quality and minimize delay. Furthermore, as the backbone of the network exchange is not the public Internet and is privately managed, the access, security and privacy of calls serviced by the PPNBE are more easily controlled. An example of such a PPNBE may be found in aforementioned U.S. application Ser. No. 12/469,454, now issued as U.S. Pat. No. 8,284,765.

Each of the calling party device 105 and the called party device 110 may be a particular CPE (Customer Premises Equipment) such as a communications device and/or computing device, which may or may not be mobile. A CPE may be, for example, a landline phone, a computer, a tablet, a smart phone, a wireless device, or other device used to originate and/or terminate voice and/or data calls. In some cases, the calling party device 105 and/or the called party device 110 each may comprise multiple devices that have a logical appearance as a single device. For example, the calling party device 105 and/or the called party device 108 may be a private bank exchange (PBX), a virtual private network (VPN), or other private exchange. In some cases, the called party device 108 may be a communications service such as a conference call service, a voting or preference-indicating service, a help-line, or a ticket sales service, to name a few.

The system 100 may include one or more features 125, 128, 130, 132, each of which enables efficiencies in the inter-carrier network switch 102. Generally, the Call Extender efficiency feature 125 may mitigate surcharges that are assessed to the inter-carrier network 102 by a vendor 118a-118b for terminating short-duration calls, and the Ingress Call Filter efficiency feature (ICF) 128 may mitigate penalties assessed to the inter-carrier network 102 for incomplete or failed calls. Further, the Auto-Dialer Detector efficiency feature 130 may detect and block calling parties 105 that are automatic dialers (which are also referred to interchangeably herein as "auto-dialers"), e.g., electronic devices or software that automatically dial telephone numbers. Still further, the Vendor Evaluator efficiency feature 132 may prevent the use of poorly performing vendors 118a-118n to service calls, and may decrease the number of trouble tickets raised against the inter-carrier network 102. Each of these features 125-132 may individually and/or collectively increase the efficiency of the inter-carrier network switch 102 and/or of the communication system 100, and each of these features 125-132 is described in more detail in later sections.

At least some of the efficiency features 125-132 may operate in conjunction with or based on data stored in a database of historical call data records (CDRs) 135 of the inter-carrier network switch 135. The CDR database 135 may be included in the switch 102 as illustrated in FIG. 1, or the CDR database may be communicatively connected to the switch 102.

Additionally, in FIG. 1, each of the efficiency features 125-132 is shown as being included as part of the inter-carrier network switch 102, however, this is only one of many possible embodiments. For example, rather than being included in the inter-carrier network switch 102, the Call Extender 125 may be disposed in the system 100 between the inter-carrier network switch 102 and a vendor 118b. At any rate, each of the efficiency features 125-132 may operate in conjunction with the inter-carrier network switch 102, whether the features 125-132 are included in the switch 102 or are communicatively connected to the switch 102.

Further, the system 100 may include any number of the efficiency features 125-132. For example, a system 100 may include any one, any two, or any three of the features 125-132, or the system 100 may include all four features 125-132. Additionally, any number of the features 125-132 (e.g., one, two, three or four of the features 125-132) may be invoked during a particular call (e.g., during the set-up and/or tear down of the call 108). Still further, a provider or operator of the communications system 100 (and/or of the inter-carrier network switch 102) may be able to independently activate and de-activate each of the features 125-132.

Figure 2:
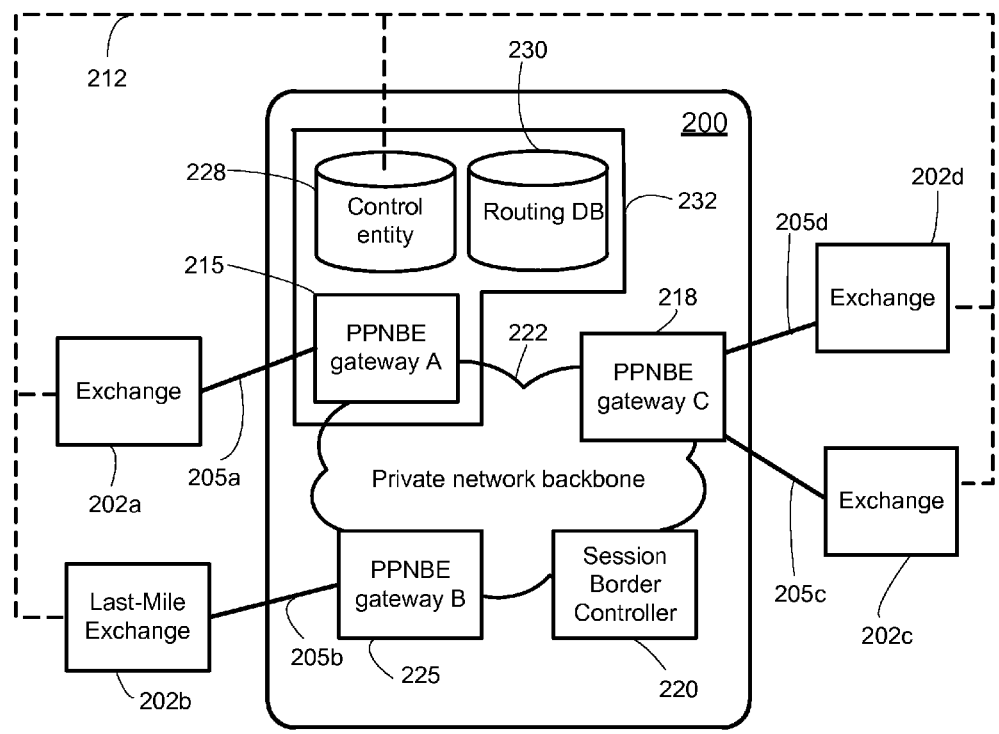
FIG. 2 illustrates an example of a private packet network backbone exchange used for efficient, inter-carrier switching.

As previously mentioned, in an embodiment, the inter-carrier network switch or exchange 102 of FIG. 1 may comprise a private packet network backbone exchange (PPNBE), such as the PPNBE described in aforementioned U.S. patent application Ser. No. 12/469,454 (now issued as U.S. Pat. No. 8,284,765), or the inter-carrier network switch or exchange 102 may comprise another PPNBE. FIG. 2 illustrates an example of a private packet network backbone exchange (PPNBE) 200 that may be included in the inter-carrier network switch 102 of FIG. 1. In fact, embodiments of the PPNBE 200 of FIG. 2 may be used in conjunction with embodiments of the system 100 of FIG. 1.

In FIG. 2, the PPNBE 200 may be connected to one or more networks, switches, or exchanges 202a, 202b, 202c, 202d, at least some of which may be provided by the different carriers, vendors, or service providers. For example, the exchange 202a may be the long distance termination provider exchange 115 of FIG. 1, and each of the exchanges 202b, 202c, 202d may be a different vendor exchange 118a, 118b, 118n of FIG. 1. One or more respective trunk groups 205a-205d may respectively connect each exchange 202a-202d to the PPNBE 200.

The PPNBE 200 and each of the other exchanges 202a-202d may be in signaling communication with a signaling network 212, which is depicted in FIG. 2 by the dashed lines. The signaling network 212 may be an out-of band network, an in-band network, or some combination of the two. In some embodiments, the signaling network 212 may be an SS7 (Signaling System No. 7) network. Other signaling protocol networks 212 may be additionally or alternatively utilized, e.g., SIP (Session Initiation Protocol), SIGTRAN, etc. In some embodiments, different types of signaling may be used for different exchanges 202a-202d. Calls may be established between the different exchanges 202a-202d using the signaling network 212, out-of-band technologies, and/or in-band signaling technologies known in the art, such as SS7, TDM (Time Division Multiplex), SIP, or VoIP (Voice over Internet Protocol) technologies.

Call traffic may enter the private packet network backbone exchange 200 from a particular exchange 202a-202d via an originating PPNBE gateway (215, 218, 220, 225). As used herein, the term "PPNBE gateway" is not limited to mean a gateway of any particular technology, but may include gateways 215, 218, 220, 225 that may support any type of communication technology, for example, a TDM-supporting gateway 215, a VoIP-supporting gateway 220 such as a session border controller, or some other technology-supporting gateway 218. Call traffic may then traverse a private network backbone 222 to a terminating PPNBE gateway 215, 218, 220, 225 to be delivered to a respective downstream exchange. For some calls, the originating gateway 215, 218, 220, 225 and the terminating gateway 215, 218, 220, 225 may be the same entity.

In some embodiments, the private network backbone 222 may include a set of privately managed nodes (not shown) to route packet call traffic. Each PPNBE gateway (215, 218, 220, 225) may convert incoming call traffic from the protocol or format used by the corresponding exchange 202a-202d into a packet format used by the set of privately managed nodes in the private network backbone 222. In some embodiments, the set of privately managed nodes may communicate using a packet format corresponding to an Internet Protocol format (IP). In some embodiments, the private network backbone 222 may use other types of technologies other than IP to deliver call traffic within the private network backbone 222, such as ATM or other packet/cell switching technologies.

Packets or cells may be routed across the privately managed nodes in the private network backbone 222 to the terminating PPNBE gateway 215, 218, 220, 225, where the packets or cells may be converted into a format understood by the corresponding receiving exchange 202a-202d. As the private network backbone 222 is not the public Internet and is privately managed, the number of nodes and routing of packets within the network 222 may be engineered and controlled to maximize call quality and minimize delay.

In the private packet network backbone exchange 200, call control may be performed by a logical call control entity 228. The control entity 228 may include one or more servers or cloud computing devices, or other computing devices having a memory and having the ability to interface with the signaling network 212. Control entity 228 may provide call control as well as feature, service and other types of control needed for communication service. In an embodiment, the logical call control entity 228 includes the call router 122 of FIG. 1, or the call router 122 of FIG. 1 includes the logical call control entity 228. Control entity 228 may be represented to the PSTN and other networks as a single logical control entity (e.g., by being identified by a single address), or may be identified via information in a single logical routing database 230. Control entity 228 may or may not be physically co-located with the logical routing database 230, but information in the logical routing database 230 may be accessible for use by the control entity 228 in establishing calls.

In the embodiment of the configuration illustrated in FIG. 2, the call control entity 220, the routing database 230 and PPNBE gateway A 215 are illustrated as being physically co-located 232. Physically co-locating the control entity 228 and/or the single logical routing database 230 with other equipment such as PPNBE gateway A 215 may be beneficial for optimizing ease of maintenance and configuration of the PPNBE 200, but is not necessary. The control entity 228 and/or the single logical routing database 230 may be located anywhere and are not required to be physically co-located with any PPNBE gateway 215, 218, 220, 225, with each other, or with any other equipment that is a part of the private packet network backbone exchange 200.

Control entity 228 may be scalable. As the volume of aggregate traffic through the PPNBE 200 increases, the number of physical computing devices on which the control entity 228 resides may be increased, however, the control entity 228 may still appear as a single logical entity having a single address, and/or may be accessed by the signaling network 212 via the information in the single logical routing database 230. If more than one physical computing device is necessary to support the call control entity 228, the more than one physical computing device may be located locally, remotely or some combination of locally and remotely.

Likewise, in some embodiments, the single, logical routing database 230 of the PPNBE 200 may be scalable. The logical routing database 230 of the PPNBE 200 may be physically located across more than one local and/or remote computer-readable storage media entities; however, the logical routing database 230 may logically appear as a single logical routing database 230.

PPNBE gateways 215, 218, 220, 225 may also be scalable. As the number of available physical connections to the PPNBE 200 desired by local exchanges in a geographical area increases, a capacity of an individual PPNBE gateway may be increased. Also, if desired, additional PPNBE gateways may be added to the PPNBE 200 to provide additional trunk connections (e.g., additional communication paths) to the exchanges 202a-202d. The additional gateways, however, may continue to be managed by control entity 228 for servicing calls and providing features and communication services. The PPNBE 200 may maintain the same single address for control entity 228 independent of the total number and size of available PPNBE gateways 215, 218, 220, 225.

The number of nodes within the private network backbone 222 may be scalable to support a desired communication traffic volume. Similar to other elements of the PPNBE 200, the nodes within the private network backbone 222 are not required to be physically co-located, but each node merely must be in communicative connection with at least one other node in the private network backbone 222.

As the PPNBE 200 includes a private network backbone 222, this and other above discussed features of the PPNBE 200 allow the PPNBE 200 to handle a logical call capacity far greater than any conventional inter-carrier exchange known in the art. In fact, the PPNBE 200 may be easily scaled to gracefully handle call traffic from multiple exchanges 202a-202d even during surge situations.

In some embodiments, the PPNBE 200 includes the historical call data records (CDR) database 135 of FIG. 1 (not depicted in FIG. 2). For example, the historical CDR database 135 may be a node that is communicatively connected to the private packet backbone network 222, and at which call data records generated by calls that traverse (and/or that attempt to traverse) the inter-carrier exchange 102 may be stored. Similar to the logical routing database 222, the historical CDR database 135 of the inter-carrier exchange 102 may be scalable. For example, the CDR database 135 may be physically located across more than one local and/or remote computer-readable storage media entities; however, the CDR database 135 may logically appear as a single historical CDR database 135.

The private packet network backbone exchange 200 may include different types of commercial equipment. For example, in the PPNBE 200, voice equipment may include a policy server, an SS7 signaling gateway, a CDR collector, a billing mediation server, an element management system, a media gateway, a signaling transfer point (STP), a voice monitoring system, etc. IP and transport equipment of the PPNBE may include a Digital Cellular Service (DCS), an IP router, an Ethernet switch, etc.

Figure 3A:
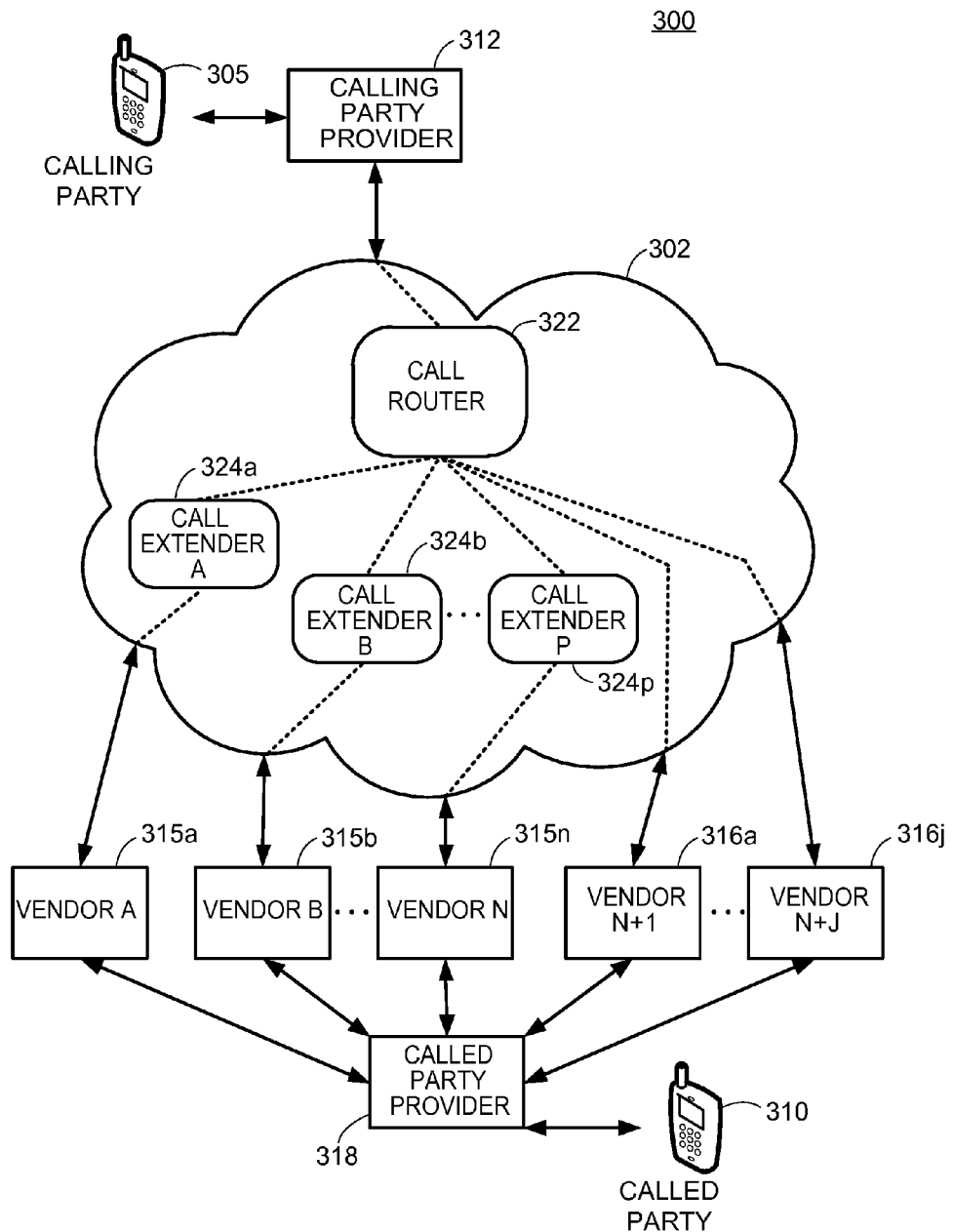
FIG. 3A depicts an embodiment of a communication system that supports a call extending feature.

FIG. 3A depicts an embodiment of a communication system 300 that supports inter-carrier switching and which implements a call extending efficiency feature. The communication system 300 may include components substantially similar to that of the example system 100. In particular, the system 300 includes an inter-carrier switch 302. A calling party 305 may originate a voice or data call that is destined for a called party 310. The originating call may be initially serviced by a calling party provider 312 of the calling party 305. For ease of discussion, FIG. 3A does not illustrate certain components similar to components of system 100, such as a long distance termination provider. However, it is understood that the example system 300 may also implement any of the components of the system 100.

In the depicted embodiment, the inter-carrier switch 302 may be connected to one or more vendor switches, systems, networks or exchanges 315a-315n that may assess surcharges for calls or data connections shorter than a certain time interval or duration (referred to herein as a "threshold" or a "time threshold") that are routed to the exchanges 315a-315n from the inter-carrier switch 302. For example, each vendor corresponding to the exchanges 315a-315n may assess a surcharge for each call shorter than a time threshold (e.g., six seconds or ten seconds), for a percentages of calls shorter than a time threshold, or based on any other suitable metric reflecting a number or percentage of calls lasting for a time shorter than a threshold of time. The inter-carrier exchange 302 may also be connected to one or more vendor switches, systems, networks or exchanges 316a-316j that do not assess surcharges for calls or data connections shorter than a certain time threshold. A call having a length less than the certain time threshold may be a "short" or "short-duration: call. Different vendors 315a-315n may have respective time thresholds, which may be the same length or may be different in length.

A call router 322 of the inter-carrier exchange 302 may receive an originating call from the calling party provider 312, select one of the vendors or carriers 315a-315n or 316a-316j, and connect the call to the selected vendor network 315a-315n or 316a-316j (e.g., via selected dashed lines). The selected vendor 315a-315n or 316a-316j may connect the call to a called party provider 318 of the called party 310, as shown in FIG. 3A. In some embodiments, the called party provider 318 may be omitted, e.g., when a vendor 315a-315n provides a direct connection to the called party 310 (not shown). In some embodiments, one or more other inter-carrier exchanges may be disposed between the vendors 315a-315n and the called party provider exchange 318 (not shown).

For each of the exchanges 315a-315n, the inter-carrier switch 302 may include a respective call extender 324a-324p feature or application to mitigate the surcharges assessed by the particular vendor corresponding to the particular exchange 315a-315n. For example, each of the call extenders 234a-324p may be an instance of the call extender 125 of FIG. 1. As discussed further with reference to FIGS. 3C, 3D, and 3E, each of the call extenders 324a-324p may extend calls or data connections completed by the respective one of the exchanges 315a-315n such that those calls or data connections appear to last as long or longer than the pre-defined time threshold. For the exchanges 316a-316j, the inter-carrier exchange 302 may not implement a call extending feature, or, in some implementations, may disable call extending features or applications corresponding to each of the exchanges 316a-316j (not shown).

Figure 3B:
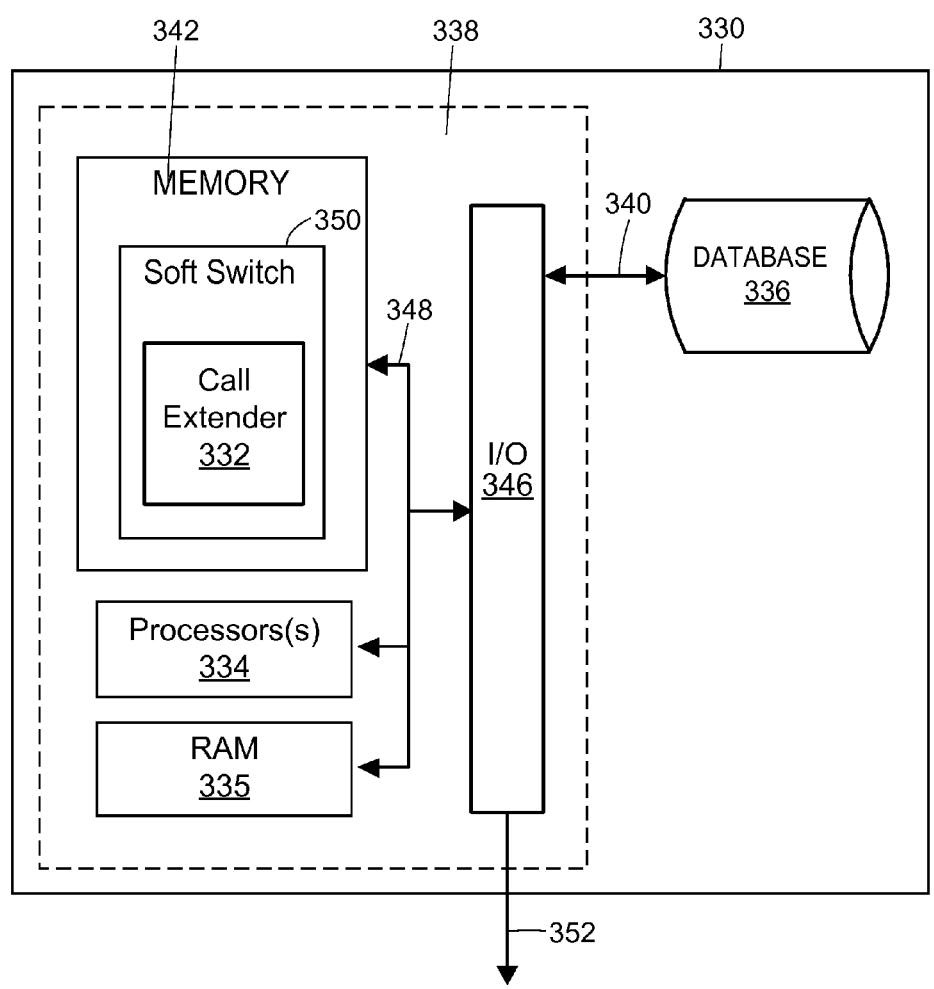
FIG. 3B is a block diagram of an example computing device implementing a call extending feature, such as the call extending feature depicted in FIG. 3A.

Each of the call extenders 324a-324p may be implemented as one or more software components executed by computing devices, such as network servers. FIG. 3B illustrates an example computing device 330 that may implement a call extender 332. The call extender 332 may be implemented as one of the call extenders 324a-324p, for example.

The computing device 330 includes one or more computer processors 334 adapted and configured to execute various software applications and components of the system 300, in addition to other software applications. The computing device 330 further includes a database 336. The database 336 is adapted to store data related to the operation of the system 300 or the operation of one or more call extenders. Such data might include, for example, signaling information received from the calling party provider 312 and/or from the exchanges 315a-315n, or analytics data allowing users to track the performance of call extension functionality. The computing device 330 may access data stored in the database 336 when executing various functions and tasks associated with the operation of the system 300.

Although illustrated as one computing device 330, the processing performed by the computing device 330 may be distributed among a plurality of servers or computing devices, in an implementation. This configuration may provide several advantages, such as, for example, enabling near real-time uploads and downloads of information as well as periodic uploads and downloads of information.

The computing device 330 may have a controller 338 that is operatively connected to the database 336 via a link 340. It should be noted that, while not shown, additional databases may be linked to the controller 338 in a known manner. The controller 338 may include a non-transitory program memory 342, the one or more processors 334 (may be called a microcontroller or a microprocessor), a random-access memory (RAM) 335, and an input/output (I/O) circuit 346, all of which may be interconnected via an address/data bus 348. The program memory 342 may be configured to store computer-readable instructions that when executed by the processors 334 cause the computing device 330 to implement a soft switch 350 including the call extender 332 feature or application.

The instructions for the soft switch 350 may cause the computing device 330 to implement the methods described with reference to FIGS. 3C, 3D, and 3E. While shown as a single block in FIG. 3B, it will be appreciated that the soft switch 350 may include a number of different programs, modules, routines, and sub-routines that may collectively cause the computing device 330 to implement the soft switch 350. Further, while the instructions for the soft switch 350 are shown being stored in the program memory 342, the instructions may additionally or alternatively be stored in the database 336 and/or RAM 335. Although the I/O circuit 346 is shown as a single block, it should be appreciated that the I/O circuit 346 may include a number of different types of I/O circuits. The RAM(s) 335 and program memories 342 may be a non-transitory memory implemented as semiconductor memories, magnetically readable memories, and/or optically readable memories, for example. The controller 338 may also be operatively connected to other components of an inter-carrier exchange, such as the inter-carrier exchange 302, via a link 352 and one or more wired or wireless network interfaces (not shown).

The soft switch 350 executed by the computing device 330 may implement functionality to connect telephone calls, VOIP calls, data connections, etc. between a calling party and a called party. Further, the soft switch 350 may be specifically configured (e.g., programmed) to implement the call extender 332 feature or application. In an implementation, this call extender 332 may: (i) monitor call routed to one or more exchanges, such as one of the exchanges 315a-315n, to identify certain calls that are terminated (e.g., by the calling party) before a certain time threshold is reached; (ii) extend identified calls past the time threshold to the vendor after processing the termination message from the calling party provider; and (iii) communicate messages (e.g., SIP messages) from/to a call router and/or vendor exchange, such as one of the exchanges 316a-315n. Such functionality is further described with reference to FIGS. 3C, 3D, and 3E.

Figure 3C:
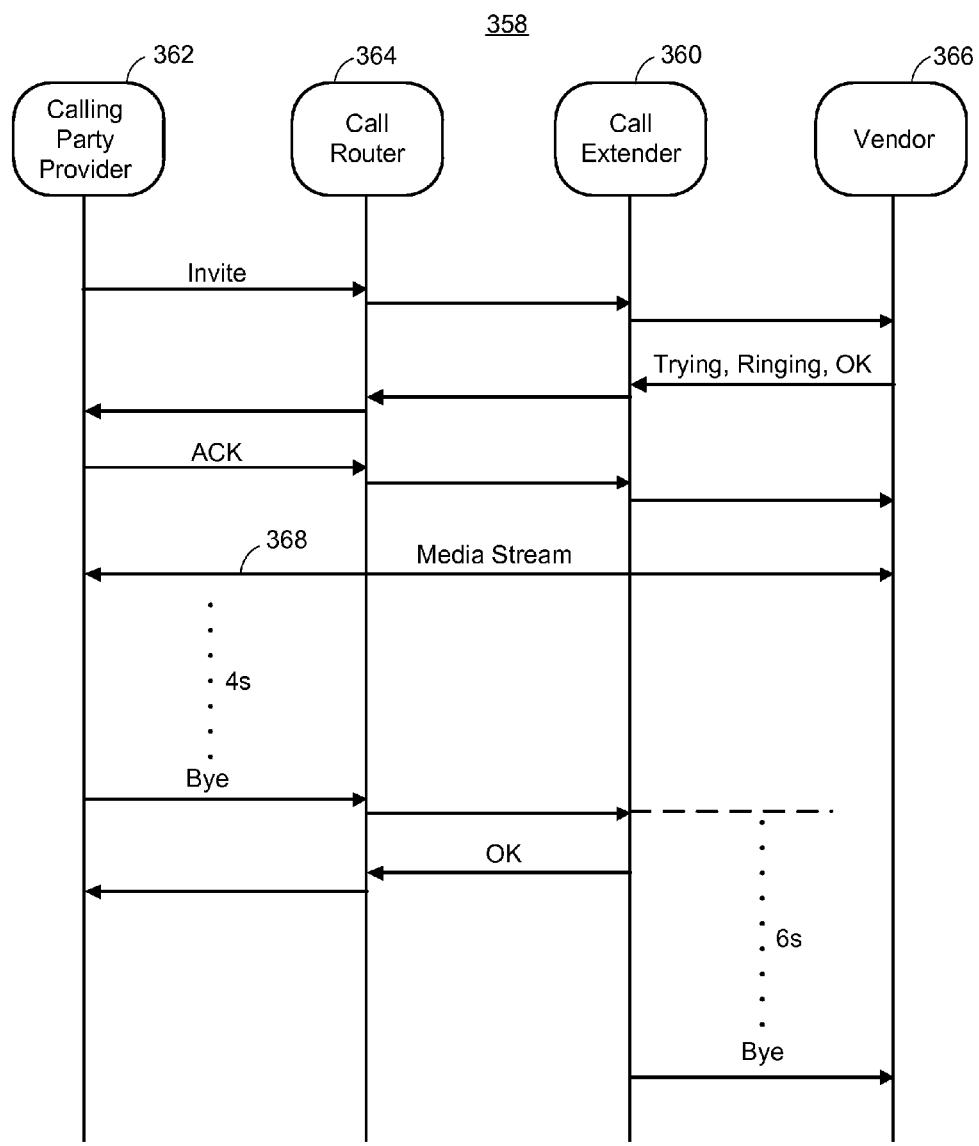
FIG. 3C is an example call flow in which a call is extended by a call extender, such as the call extending feature depicted in FIG. 3A.

In particular, FIG. 3C illustrates an example call flow 358 in which a call extender 360 extends a call originated at a calling party corresponding to a calling party provider 362. The functionalities described with reference to the call flow 358 may be implemented by one of the systems 100 or 300, for example. Although the Session Initiation Protocol (SIP) is emphasized with reference to FIG. 3C, it is understood that a call extender may extend calls of any suitable signaling communications protocol or protocols.

The calling party provider 362 may communicate an INVITE message (e.g., via the SIP protocol) to a call router 364, such as the call router 322, to establish a connection (e.g., for a voice or data call, referred to as a "media stream" herein) between a calling party and a called party (not shown). The call router 364 may forward the INVITE message to the call extender 360, and the call extender 360 may forward the INVITE message to an exchange 366 to complete the requested call. Subsequently, the exchange 366 may generate and communicate trying, ringing, and OK messages to the calling party provider 362 via the call router 364 and the call extender 360, and the calling party provider 362 may communicate an ACK message to the exchange 366 (e.g., via the call router 364 and call extender 360) to confirm reliable message exchanges. In this manner, the system 300 may establish a media stream 368 or call between the calling party and the called party.

In the scenario illustrated in FIG. 3C, the media stream 368 may last for four seconds before the calling party provider 362 communicates a BYE message to the call router 364 to terminate the media stream 368. The call router 364 may forward the BYE message to the call extender 360. During the first four seconds of the media stream 368, the call extender 360 may monitor the media stream 368 to track the length of the session. When the call extender 360 receives the BYE message from the call router 364, the call extender 360 may, in certain circumstances "extend" the session so as to prevent the vendor operating the exchange 366 from assessing a surcharge.

In one scenario, the vendor operating the exchange 366 may assess surcharges for calls less than ten seconds or if a certain percentage of calls are less than ten seconds (e.g., the time threshold of the vendor 366 is set to ten seconds). As such, in the example call flow 358, the call extender 360 may: (i) send an OK message back to the calling party provider after receiving the BYE message to indicate to the calling party provider that the call is being terminated; (ii) wait for six additional seconds before forwarding the BYE message to the exchange 366 to terminate the media stream 368; and (iii) after waiting the additional six seconds, forward the BYE message to the exchange 366. In this manner, the call extender 360 may "extend" the media stream 368 to ten or more seconds such that the vendor of the exchange 366 does not assess a surcharge.

Although certain times (four second, six second, and ten seconds) are utilized by way of example in FIG. 3C and the corresponding description, it is understood that a call may terminate after any number of seconds, a call extender may extend a call or media stream for any suitable number of second or seconds to reach or surpass a threshold value, and a vendor may assess surcharges based on calls of any pre-determined length. Further, although FIG. 3C illustrates only one established media stream with the exchange 366, a call router and call extender may establish, monitor, and extend any number (two, three, fifteen, one hundred, etc.) of media streams or calls between a calling party provider and an exchange.

In some implementations, some or all of the call extenders 360, 332, and 324a-324n may monitor and extend calls based on contracts, agreements, or other information corresponding to vendors and/or based on target percentages of "long" calls. For example, each of the call extenders 324a-324n may extend calls differently (e.g., with different thresholds or timings) than other of the call extenders 324a-324n based on information specific to certain vendors. One vendor corresponding to exchange 315a may charge a fee if more than 20% of calls directed to the exchange 315a from the inter-carrier network 302 in any given month are less than fifteen seconds long. As such, the call extender 324a may ensure that 80% or more of calls supplied to the exchange 315a are equal to or greater than fifteen seconds in length. Another example vendor corresponding to exchange 315b may charge a fee if more than 35% of calls directed to the exchange 315b from the inter-carrier network 302 in any given week are less than ten seconds longs. As such, the call extender 324a may ensure that 65% or more of calls supplied to the exchange 315b are equal to or greater than ten seconds in length.

In an implementation, some or all of the call extenders 360, 332, and 324a-324n may utilize a random number generator to ensure that a certain percentage (e.g., 80%) of calls routed to a particular exchange (e.g., corresponding to a particular vendor) are longer than a certain threshold. For example, the call extender 332, implemented as part of the soft switch 350, may include a random number generator routine which generates a random number between one and one hundred for each call traversing the soft switch 350. To ensure that a certain percentage of calls traversing the soft switch 350 last longer than a threshold time, the call extender 332 may monitor and extend (if necessary) all calls for which the generated random number is in a pre-defined range. For example, to ensure that 85% of calls routed to an exchange last longer than ten seconds, the call extender may monitor and extend if necessary (e.g., to or past ten seconds) all calls for which the generated random number is less than or equal to eighty-five.

In some cases, a call extender, such as the call extender 332 may extend a certain percentage or number of calls based on a determination of costs assessed by a vendor and accumulated from extending calls, which costs are substantially minimized or improved. Both extending calls and routing short calls (e.g., shorter than a certain threshold) may result in costs (e.g., charged to the operator of the inter-carrier network 302). Thus, some or all of the call extenders 360, 332, and 324a-324n may implement routines to determine a number of calls or a percentage of calls in a given time period that should be extended so as to substantially minimize a total cost to the operator, where the total cost to the operator is the sum of costs assessed by a vendor and costs resulting from extending calls. In some implementations, the call extender 332 may automatically determine conditions near minimizing or otherwise improving the cost incurred from extending calls and/or assessed by a vendor. For example, the call extender 332 may implement one or more optimization routines (e.g., based on certain objective functions), learning routines, or other suitable routines to automatically determine near optimal configurations of the call extender 332. In other implementations, the call extender 332 may be manually (e.g., via user interaction) configured to near optimally extend a certain number or percentage of calls.

Figure 3D:
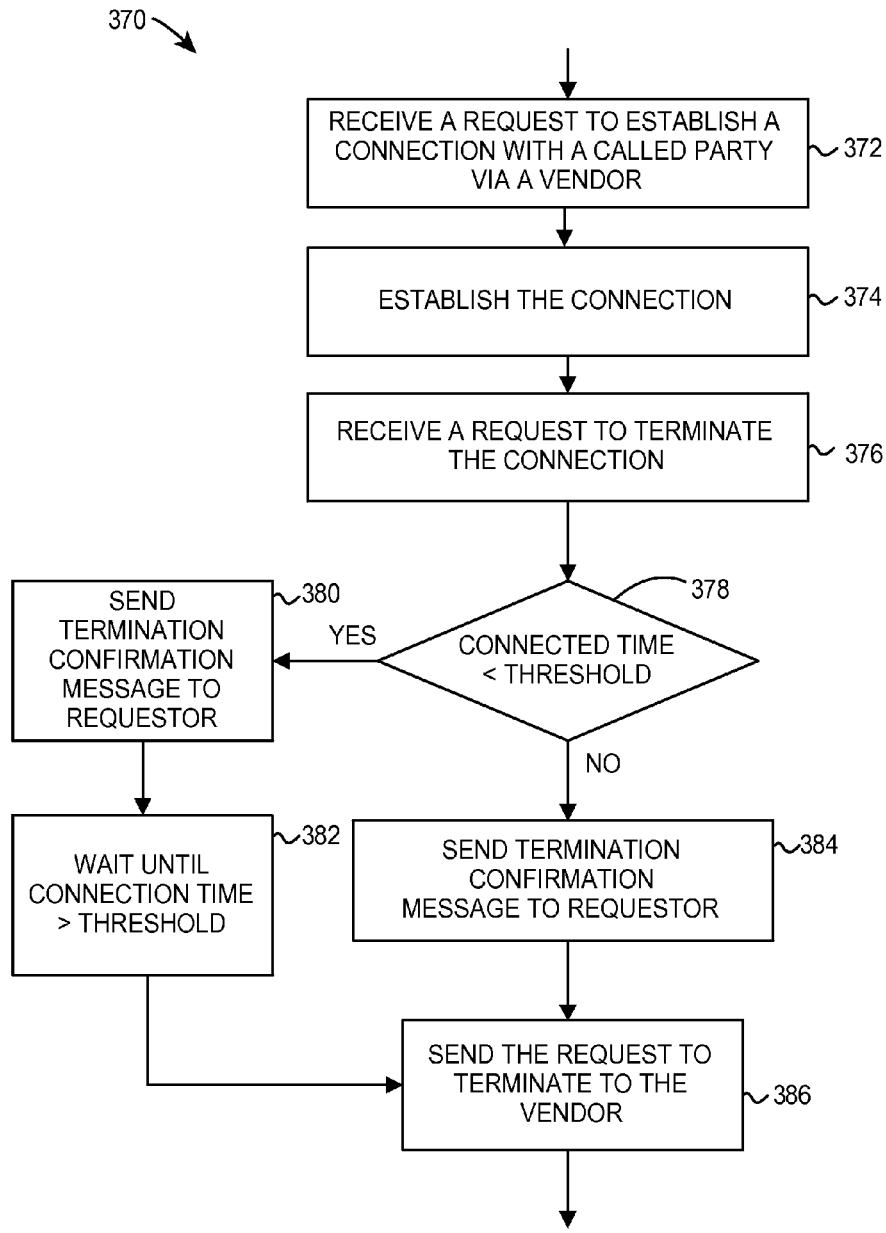
FIG. 3D is a flow diagram of an example method for extending a call which can be implemented in the system depicted in FIG. 3A.
Figure 3E:
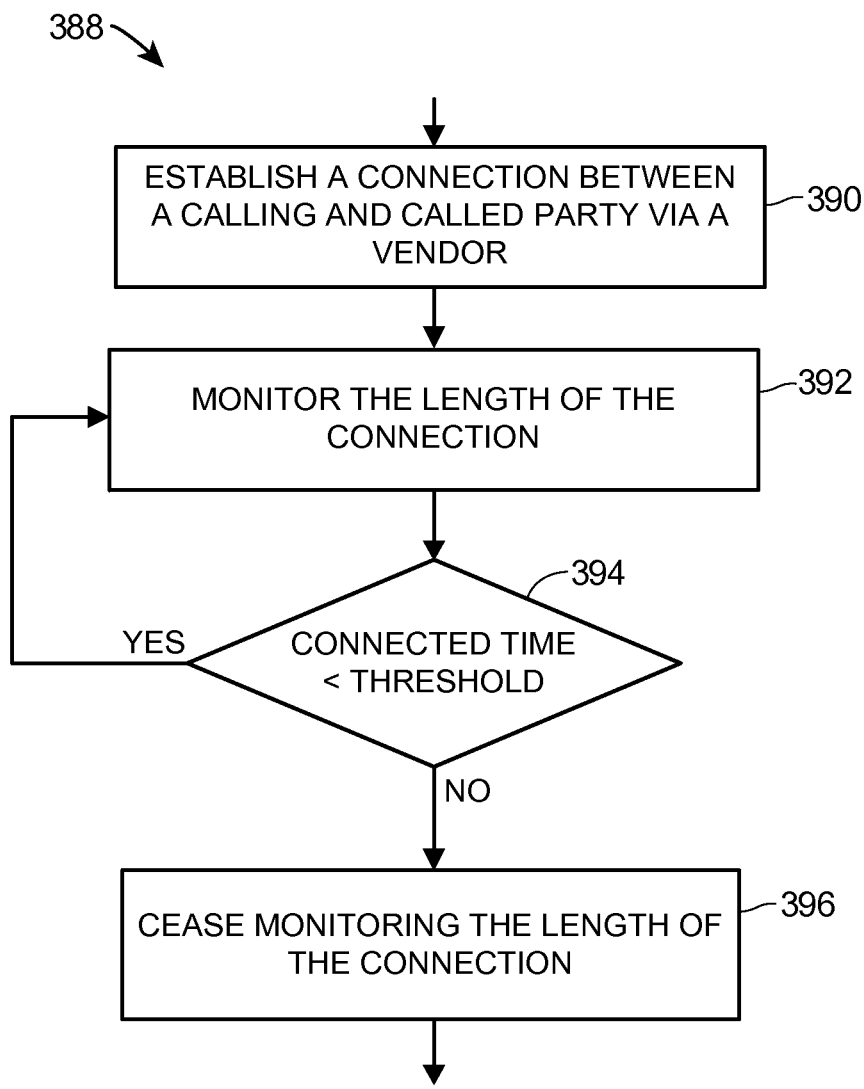
FIG. 3E is a flow diagram of an example method for monitoring the length of calls which can be implemented in the system depicted in FIG. 3A.

FIG. 3D is a flow diagram of an example method 370 for extending calls so as to reduce surcharges assessed by vendors. The method 370 may be implemented by any one of the call extenders 360, 332, and 324a-324n, for example.

A request to establish a connection (e.g., a call or media stream session) between a called party and a calling party may be received (block 372). The request may, for example, include a SIP INVITE message and may be forwarded to one of the call extenders 324a-324n from the calling party provider 312 via the call router 322. Subsequently, the requested connection may be established between the called party and the calling party (block 374). For example, one of the exchanges 315a-315n may connect the call to a called party provider 318 of the called party 310.

After some amount of time, during which the established connection (e.g., call) has been established, a request from the calling party is received indicating that the connection should be terminated (block 376). For example, one of the call extenders 324a-324n may receive a BYE message from the calling party provider 312 via the call router 322. A call extender, such as one of the call extenders 324a-324n, may then determine if the connection has been established for a length of time greater than a threshold time (block 378). In some implementations, block 378 may only be executed for certain calls (e.g., as determined based on a random number, as discussed above).

If the connection has been established for a length of time less than the threshold value, the flow may continue to block 380 where a termination confirmation message (e.g., an OK message) is sent to the requester in response to the request to terminate the connection. Additionally, a call extender, such as one of the call extenders 324a-324n, may maintain the established connection with the terminating vendor until the connection lasts past the threshold time (block 382). Once the connection is maintained past the threshold, the request to terminate the connection is forwarded to the vendor to actually terminate the connection. In this manner, a call extender may both respond to a termination message sent by the calling party and extend the connection to the vendor so as to avoid surcharges assessed by a vendor.

On the other hand, if the connection has been established for a length of time equal to or greater than the threshold value, the flow may continue to block 384. A termination confirmation message (e.g., an OK message) may be sent to the requester in response to the request to terminate the connection, and the request to terminate the connection may be forwarded to the vendor operating the exchange that completes the call (block 386). In some embodiments of the method 370, the blocks 380 and 384 may be combined into a single block executing immediately prior to the block 378.

In some implementations, call extenders may only monitor calls or data connections for a pre-defined length of time. FIG. 3E is a flow diagram of an example method 388 for monitoring calls for possible extension. Some or all of the call extenders 324a-324n, 332, and 360 may implement the method 388, for example.

A connection (e.g., call session) may be established between a calling party and a called party (block 390). For example, a call or other media streaming connection may be established as further discussed with reference to FIGS. 3C and 3D. A call extender, such as one of the call extenders 324a-324n, 332, and 360, may then monitor the connection to track the length of time of the connection (block 392). For example, the call extenders 332 may utilize a clock integrated into the processors 334 or other components of the computing device 330 to time the established connection (e.g., in milliseconds, seconds, minutes, etc.).

It is then determined if the tracked time of the connection is equal to or greater than a threshold value (block 394). If the elapsed time of the connection is less than the threshold value, the flow may revert to block 392 where the call extender continues to monitor the elapsed time of the connection. However, if the elapsed time is equal to or greater than the threshold time value the flow may continue to block 396 where the monitoring of the connection, by the call extender, ceases. In some implementations, the "ceasing" of monitoring the connection may include ceasing the execution of call extending functionality of a soft switch. For example, a call router may continue to route a call or media stream through the soft switch 350. However, after a connection lasts for a length of time greater than or equal to a threshold, the soft switch 350 may no longer employ (e.g., execute) the call extender 332 to monitor the elapsed time of a connection and/or extend a connection.

In some implementations, call extenders, such as the call extenders 324a-324n, 332, and 360, and/or soft switches implementing call extenders may collect statistics and/or produce reports indicative of call extensions, lengths of calls, calls available for extension, etc. For example, the call extender 332 may record (e.g., in the database 336) how many call were extended in a certain time period, how long certain calls were extended past requested termination, how many calls were monitored for extension, the overall length of some or all calls traversing the soft switch 350, and/or any other suitable metrics indicative of the performance of the call extender 332. In this manner, operators of the computing device 330 or an inter-carrier network (e.g., the inter-carrier network 302) may audit call extending functionalities of the inter-carrier network to monitor costs, computational efficiencies, errors, etc.

Figure 4A:
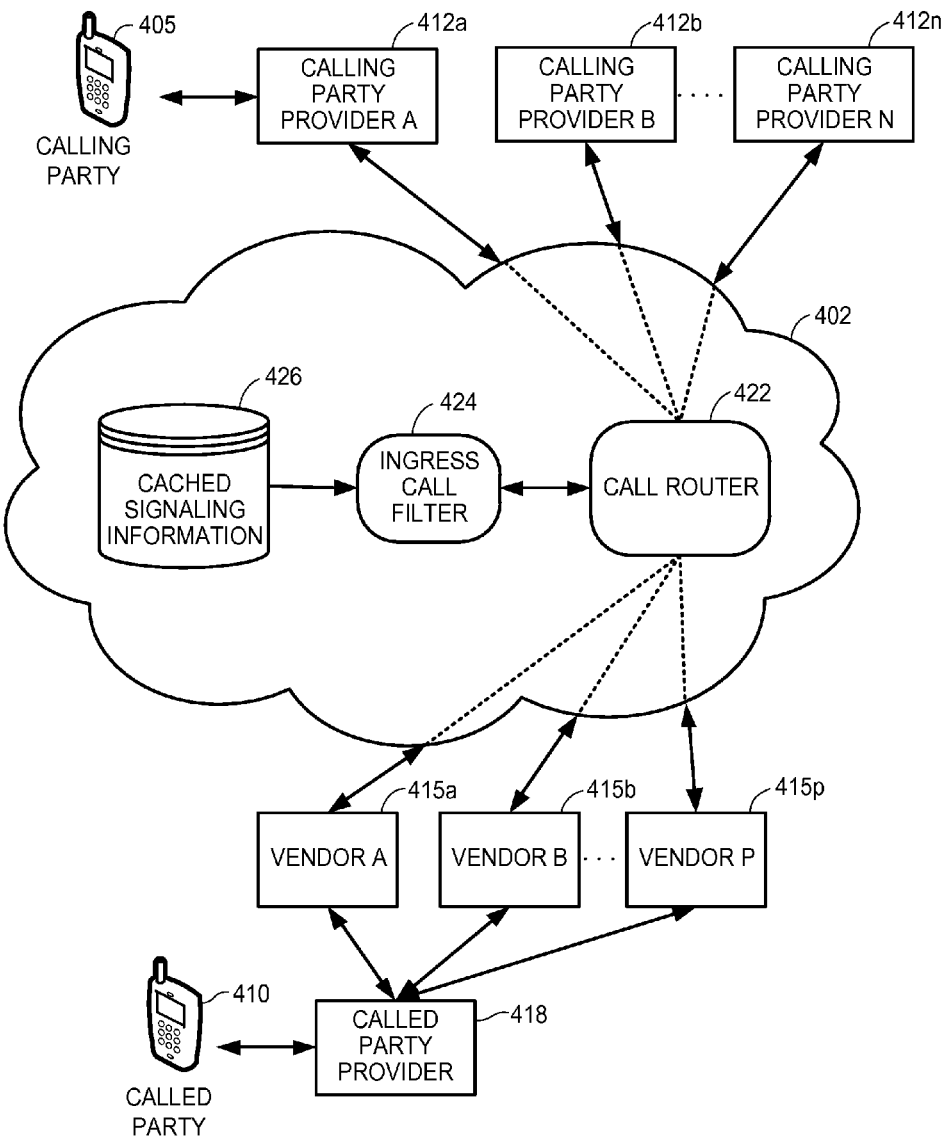
FIG. 4A depicts an embodiment of a communication system that supports an ingress call filter feature.

FIG. 4A depicts an embodiment of a communication system 400 that supports inter-carrier switching and which implements an ingress call filtering efficiency feature. The communication system 400 may include components substantially similar to that of the example system 100. In particular, the system 400 includes an inter-carrier switch 402. A calling party 405 may originate a voice or data call that is destined for a called party 410. The originating call may be initially serviced by one or more calling party providers 412a-412n of the calling party 405. For ease of discussion, FIG. 4A does not illustrate certain components substantially similar to components of systems 100, such as a long distance termination provider. However, it is understood that the example system 400 may implement any of the components of the system 100.

In this embodiment, the inter-carrier exchange 402 may be connected to one or more exchanges 415a-415p. At least some of the exchanges 415a-415p may correspond to vendors that assess surcharges when attempted calls or data connections to the called party 410 cannot be completed. For example, the vendor corresponding to the exchanges 415a may assess a surcharge for a number or percentage of calls to invalid phone numbers, numbers not in service, unallocated phone numbers, etc. However, generally the vendors operating the exchanges 415a-415p may assess surcharges for failed calls or data connections returning any cause codes other than those indicating invalid phone numbers, numbers not in service, or unallocated phone numbers.

A call router 422 of the inter-carrier exchange 402 may receive the originating call from one of the calling party providers 412a-412n, select one of the vendors or carrier exchanges 415a-415p, and connect the call to the selected vendor network 415a-415p (e.g., via selected dashed lines in FIG. 4A). The selected vendor 415a-415p may connect the call to a called party provider 418 of the called party 410.

The inter-carrier network 402 may include an ingress call filter 424 feature or application to mitigate the surcharges assessed by the vendors corresponding to the exchanges 415a-415p. For example, the ingress call filter 424 may be the ingress call filter 128 of FIG. 1. As discussed further with reference to FIGS. 4C, 4D, and 4E, the ingress call filter 424 may filter attempted calls or data connections (e.g., SIP INVITE requests) from the calling party providers 412a-412n based on predictions about which of those attempted call or data connections will fail. In the implementation illustrated in FIG. 4A, a data storage device 426 (e.g., the CDR database 135) may communicate cached signaling information to the ingress call filter 424 such that the ingress call filter 424 may predict and filter connections that will fail. For example, the cached signaling information may indicate previously failed calls and corresponding cause codes that have been routed through the call router 422 within a recent time period (e.g., a most recent week, day, hour, etc.). Operators of the inter-carrier network 402 may activate (e.g., turn on and off) the ingress call filter 424 for each of the providers 412a-412n and may, in some cases, only filter attempted calls or data connections from some of the providers 412a-412n.

Figure 4B:
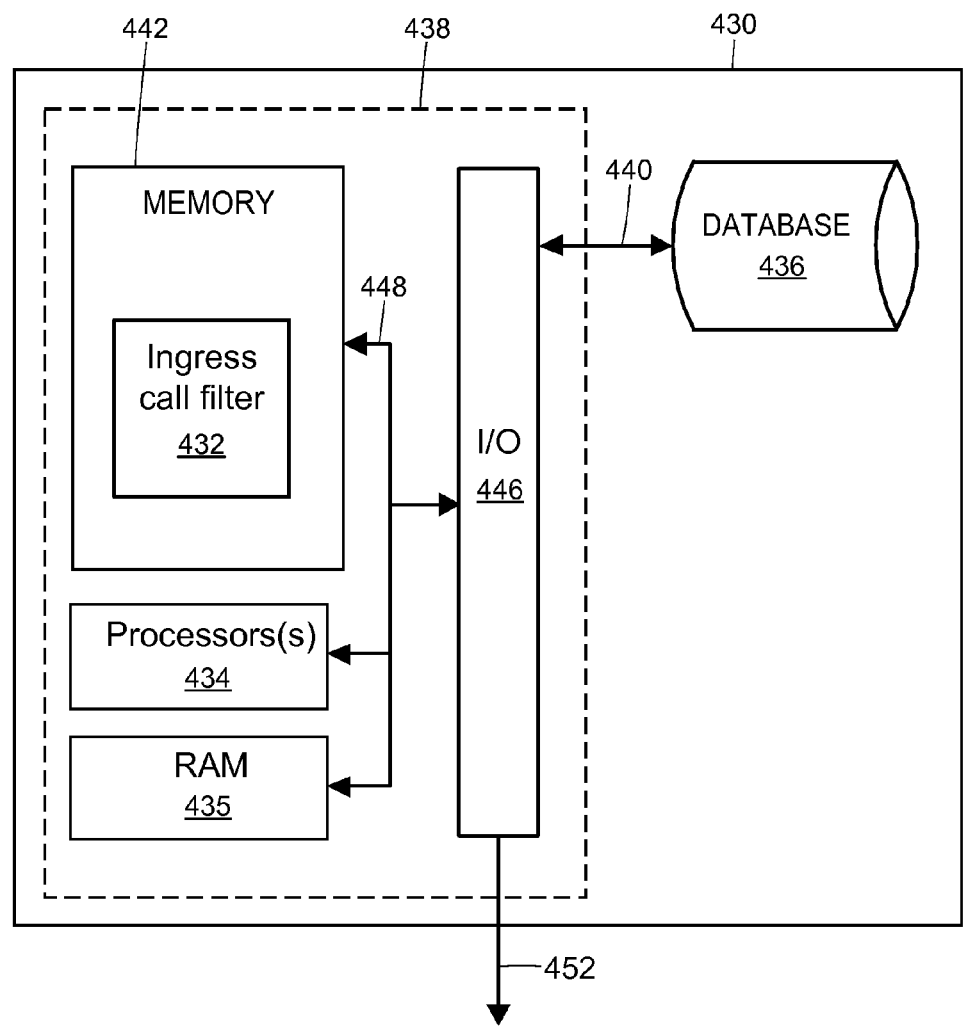
FIG. 4B is a block diagram of an example computing device implementing an ingress call filter feature, such as the ingress call filter feature depicted in FIG. 4A.

The ingress call filter 424 may include one or more software components executed by a computing device, such as a network server. FIG. 4B illustrates an example computing device 430 that may implement an ingress call filter 432. The ingress call filter 432 may be implemented as the ingress call filter 424 in the inter-carrier network 402, for example.

The computing device 430 includes one or more computer processors 434 adapted and configured to execute various software applications and components of the system 400, in addition to other software applications. The computing device 430 further includes a database 436. The database 436 is adapted to store data related to the operation of the system 400 or the operation of one or more call extenders. Such data might include, for example, cached signaling information received via a feed from the data storage device 426 and/or analytics data allowing users to track the performance of the ingress call filter 432. The computing device 430 may access data stored in the database 436 when executing various functions and tasks associated with the operation of the system 400.

Although illustrated as one computing device 430, the processing performed by the computing device 430 may be distributed among a plurality of servers, in an implementation. This configuration may provide several advantages, such as, for example, enabling near real-time uploads and downloads of information as well as periodic uploads and downloads of information.

The computing device 430 may have a controller 438 that is operatively connected to the database 436 via a link 440. It should be noted that, while not shown, additional databases may be linked to the controller 438 in a known manner. The controller 438 may include a non-transitory program memory 442, the one or more processors 434 (may be called a microcontroller or a microprocessor), a random-access memory (RAM) 435, and an input/output (I/O) circuit 446, all of which may be interconnected via an address/data bus 348. The program memory 442 may be configured to store computer-readable instructions that when executed by the processors 434 cause the computing device 430 to implement the ingress call filter 432 feature or application.

The instructions for the ingress call filter 432 may cause the computing device 430 to implement the methods described with reference to FIGS. 4C, 4D, and 4E. While shown as a single block in FIG. 4B, it will be appreciated that the ingress call filter 432 may include a number of different programs, modules, routines, and sub-routines that may collectively cause the computing device 430 to implement the ingress call filter 432. Further, while the instructions for the ingress call filter 432 are shown being stored in the program memory 442, the instructions may additionally or alternatively be stored in the database 436 and/or RAM 435. Although the I/O circuit 446 is shown as a single block, it should be appreciated that the I/O circuit 446 may include a number of different types of I/O circuits. The RAM(s) 435 and program memories 342 may be a non-transitory memory implemented as semiconductor memories, magnetically readable memories, and/or optically readable memories, for example. The controller 438 may also be operatively connected to other components of an inter-carrier exchange, such as the inter-carrier exchange 402, via a link 452 and one or more wired or wireless network interfaces (not shown).

In an implementation, this ingress call filter 432 may: (i) receive a feed of cached signaling information from a data storage device, such as the data storage device 426 or the CDR database 135; (ii) receive queries from a call router, such as the call router 422, identifying a called party corresponding to an attempted call (e.g., by a phone number); (iii) determine based on the received cached signaling information if the attempted call to the called party will likely fail; and (iv) if it is likely that the attempted call will fail, filter the attempted call by indicating to the call router 422 that the attempted call should be filtered or rejected. In addition, the ingress call filter 432, the data storage device 426, the call router 422, and/or other components of the inter-carrier network 402 may generate and transmit proprietary or otherwise unique cause codes indicating the filtering of calls by the ingress call filter 424.

Figure 4C:
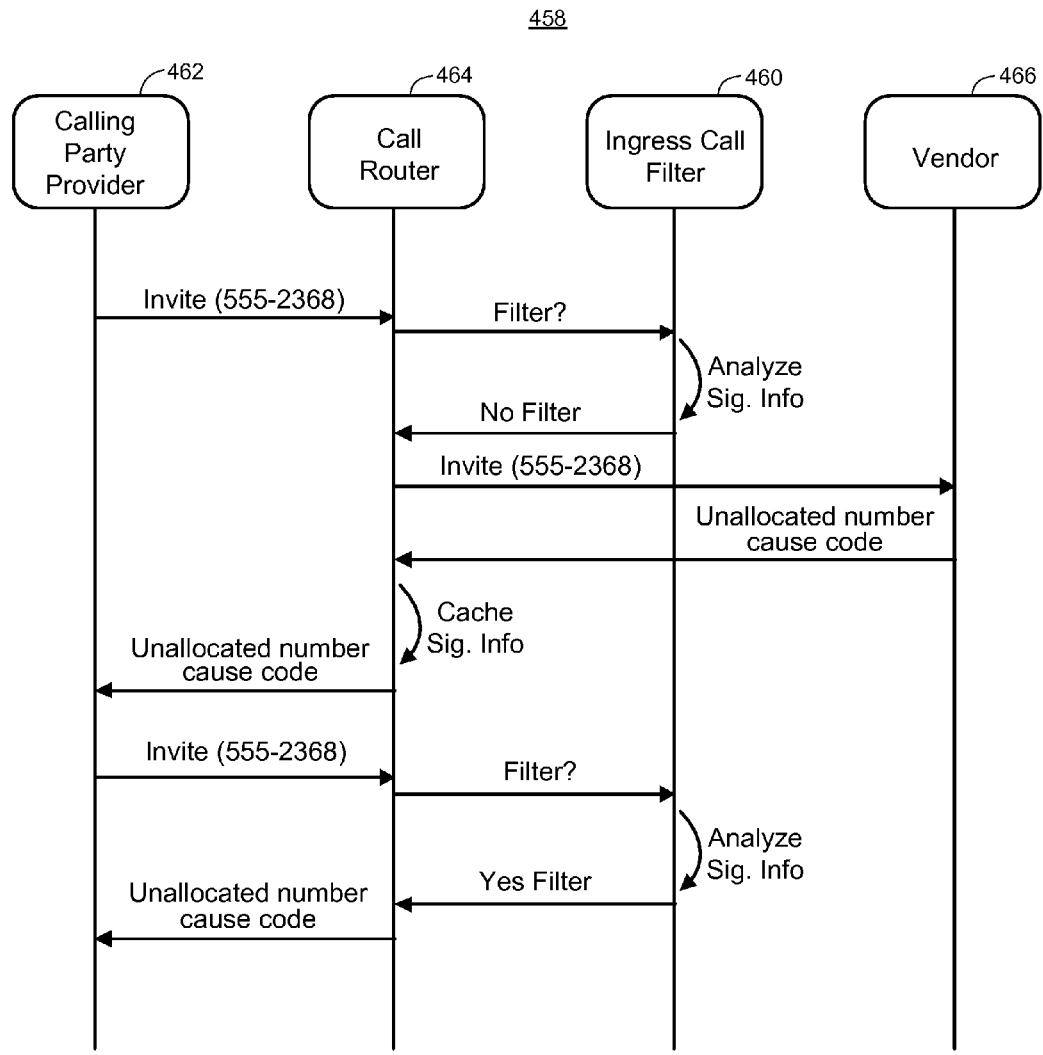
FIG. 4C is an example call flow in which a call is filtered by an ingress call filter, such as the ingress call filter feature depicted in FIG. 4A.

FIG. 4C illustrates an example call flow 458 in which an ingress call filter 460 filters incoming calls from a calling party provider 462. The functionalities described with reference to the call flow 458 may be implemented by one of the systems 100 or 400, for example. Although the Session Initiation Protocol (SIP) is emphasized with reference to FIG. 4C, it is understood that an ingress call filter may filters calls established via any suitable signaling communications protocol.

The calling party provider 462 may communicate an INVITE message (e.g., via the SIP protocol) to a call router 464, such as the call router 464, to establish a call between a calling party and a specific called party (not shown). In an implementation, the INVITE message may identify a phone number of the specific called party via one or more digits (e.g., 555-2368) or via any other suitable symbols, alpha-numeric characters, etc. The call router 464 may then query the ingress call filter 460 to determine if the call to the specific called party (e.g., 555-2368) should be filtered, as indicated in FIG. 4C by the label "Filter?".

The ingress call filter 460 may then analyze cached signaling information (e.g., received from the data storage device 426) to determine if the attempted call is to be filtered. Such a determination may be based on whether any attempted calls, or a certain number or percentage of attempted calls, to the called party have failed within a most recent time period for which cached signaling information has been received. Cached signaling information received from the data storage device 426 may indicate recent failed calls, such as calls to unallocated numbers, via one or more cause codes (e.g., ISUP, SIP, or other signaling cause codes). In an implementation, the ingress call filter 460 may receive a "feed" of currently cached signaling information from the data storage device 426 at periodic times. For example, the ingress call filter 460 may receive an updated batch of cached signaling information every ten seconds, one minute, one hour, etc. In certain implementations, the feed of cached signaling information sent to the ingress call filter 460 may include near real-time updates of the cached signaling information.

In the scenario illustrated in FIG. 4C, the ingress call filter 460 may determine that the cached signaling information indicates that no attempted calls to the specific number 555-2368 have failed within a most recent time period. As such, the ingress call filter 460 may indicate to the call router that the attempted call should not be filtered (i.e., should be completed), as illustrated in FIG. 4C by the label "No Filter."

Subsequently, the call router 464 may attempt to complete the requested call from the calling party via an exchange 466 operated by a certain vendor. Upon attempting to complete the call, the exchange 466 may return a cause code to the call router 464 indicating that the requested call to 555-2368, in the scenario, could not be completed. By way of example, the exchange 466 may return a cause code indicating an unallocated number (e.g., ISUP 1, SIP response 404 as illustrated in FIG. 4C, or similar), user busy (e.g., ISUP 17, SIP 486, etc.), no user responding (e.g., ISUP 18, SIP 408, etc.), call rejected (e.g., ISUP 21, SIP 433, etc.), destination out of order (e.g., ISUP 27, SIP 405, etc.), and the like.

The call router 464, the ingress call filter 460, or any other suitable computing device or component of an inter-carrier network in which the call router 464 is disposed may then cache the received signaling information from the exchange 466. The call router 464 or other component of an inter-carrier network, such as the inter-carrier network 402, may cache an indication of the cause code corresponding to the specific called party (e.g., 555-2368) in a data storage device, such as the data storage device 426 or the CDR database 135.

Upon another request for a call to the same called party (e.g., 555-2368), the ingress call filter 460 may analyze the cached signaling information and identify the cached cause code corresponding to the called party. In this scenario, the ingress call filter 460 may indicate to the call router 464 that the new call to the same called party should be filtered (e.g., rejected) due to a likelihood that the call will fail, as illustrated in FIG. 4C by the label "Yes Filter." The call router 464 may then, instead of completing the requested call via the exchange 466, return a cause code indicative of a rejected or failed call to the calling party provider 462. The cause code returned to the calling party provider 464 upon filtering the call may be the same or different than the cause code originally returned by the exchange 466 and cached in the data storage device 426.

In some implementations, the data storage device 426 may only retain cached signaling information for a predefined or otherwise determined length of time, after which the cached signaling information is removed or deleted from the data storage device 426. For example, the data storage device 426 may only retain cached signaling information, such as cause codes from the exchange 466, for six hours, twenty-four hours, or any other suitable length of time. In this manner, the call router 464 may re-attempt to connect calling parties to previously filtered numbers upon a prompting by the calling party provider 462, which re-attempt may be successful or may again fail. In the event that the re-attempt fails, the call router 464 or other component may cache another cause code corresponding to the called party such that the call to the called party are filtered for the next "lifetime" of the cached signaling information.

Further, the ingress call filter 460 and/or the call router 464 may generate proprietary or otherwise unique cause codes, for storage in the data storage device 426. The proprietary or otherwise unique cause codes may be indicative of calls being filtered by the ingress call filter 460, and may differ from standard ISUP cause codes or other cause codes generally used in a signaling communications protocol. By storing these unique cause codes, operators of the inter-carrier network implementing the ingress call filter 460 may query the stored unique cause codes to audit the ingress call filtering functionality of the inter-carrier network. For example, a customer of the inter-carrier network may contact the operators expressing concern over a number of calls rejected by the call router 464. Subsequently, the operators may query the unique cause codes stored by the ingress call filter 460 to determine that many of the calls originated by the customer were to unallocated numbers, busy numbers, etc. and were filtered by the ingress call filter 460.

The call router 464 and/or other components of an inter-carrier network may, in some implementations, prioritize cause codes stored in the cached signaling information. For example, the call router 464 may receive multiple different cause codes corresponding to a specific called party, and the call router 464 may, based on a user-defined (e.g., programmed) prioritization, only store one or a certain number of the multiple different cause codes. For example, the call router 464 may be configured to store an "unallocated number" cause code over a "user busy" cause code.

Also, a time for which portions of the cached signaling information are retained in the data storage device 426 (e.g., the "lifetime" of the cached signaling information) may vary based on cause codes indicated in the portions of the cached signaling information or based on calling party providers corresponding to the portions of the cached signaling information. For example, if an exchange returns an "allocated number" cause code for a certain number, this "unallocated number" signaling information may be cached for a time longer than a length of time that "no user responding" signaling information is cached. Additionally, certain ones of the calling party providers 412a-412n may more frequently request calls that fail as compared to other of the calling party providers 412a-412n. As such, the data storage device 426 may be configured such that cached signaling information corresponding to certain of the calling party providers 412a-412n is stored for longer periods of time than cached signaling information for other of the calling party providers 412a-412n.

Figure 4D:
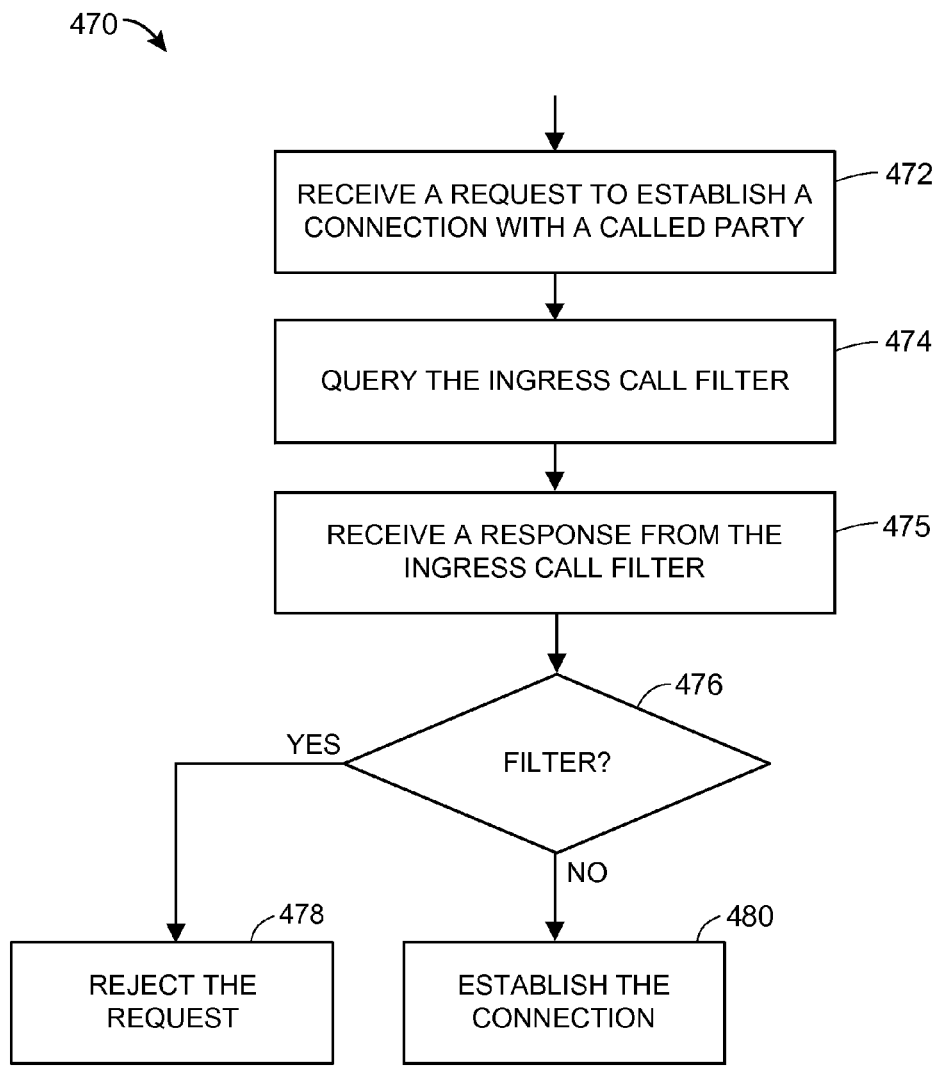
FIG. 4D is a flow diagram of an example method for filtering requested connections which can be implemented in the system depicted in FIG. 4A.

FIG. 4D is a flow diagram of an example method 470 for filtering calls, based on cached signaling information, so as to reduce surcharges assessed by vendors and to more efficiently use resources of the inter-carrier network 102. The method 470 may be implemented by one of the call routers 422 or 464, for example.

A request is received (e.g., from a calling party provider) to establish a connection (e.g., a call) with a called party. The calling party provider 462 may, for example, send an INVITE message to the call router 464 identifying a called party by a phone number. Subsequently, the call router 464 may query the ingress call filter 460 to determine if the requested call should be filtered (block 474). In some cases, the call router 464 may forward the request (e.g., INVITE) from the calling party provider 462 directly to the ingress call filter 460, and, in other cases, the call router 464 may generate and send a query message different from the request from the calling party provider 462.

A response may then be received from the ingress call filter 460 (block 475), and it is determined if, based on the response, the requested connection should be established or filtered (e.g., rejected) (block 476). If the response from the ingress call filter 460 indicates that the requested connection should be filtered, the flow may continue to block 478 where the call router 464 may return a cause code to the requesting party indicating that the requested connection is rejected or failed. If the response from the ingress call filter 460 indicates that the requested connection should be established, the call router 464 may complete the requested connection via a selected exchange.

Figure 4E:
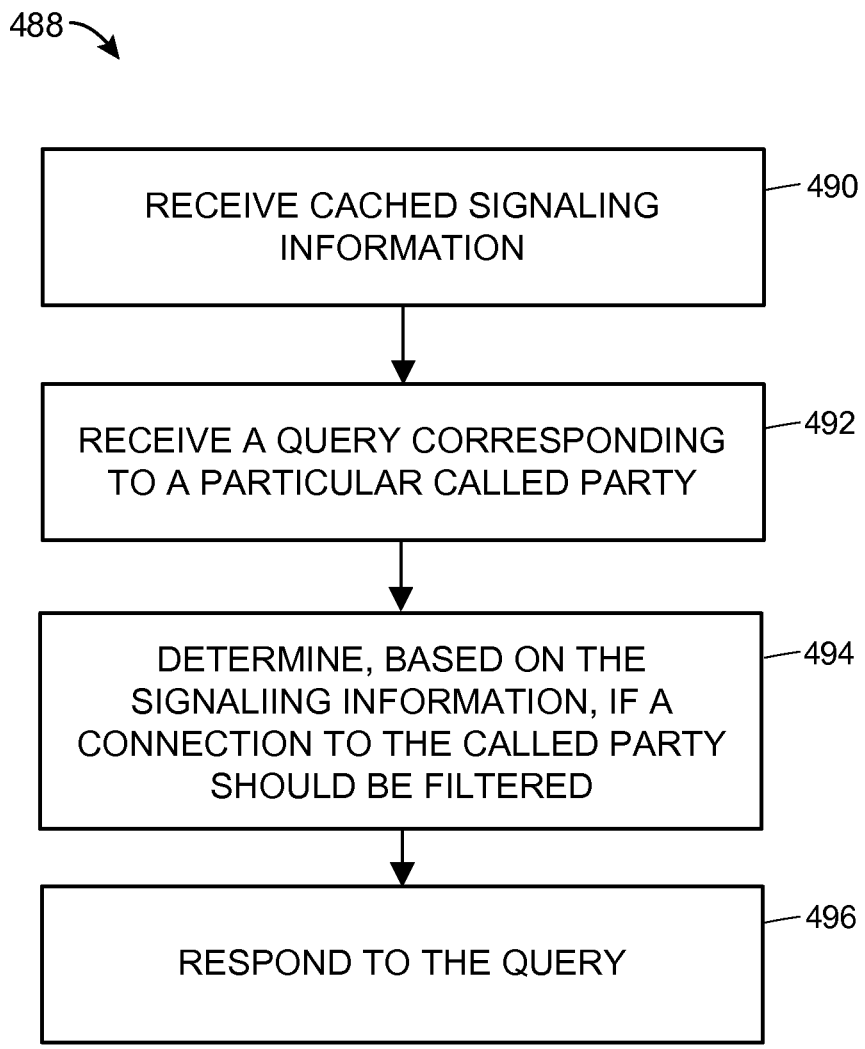
FIG. 4E is a flow diagram of an example method for determining connections that should be filtered which can be implemented in the system depicted in FIG. 4A.

FIG. 4E is a flow diagram of an example method 488 for determining if an attempted call should be filtered based on cached signaling information. Some or all of the ingress call filters 424, 432, and 460 may implemented the method 488, for example.

To begin, cached signaling information may be received (block 490). As discussed above, the ingress call filter 424 may receive a feed of cached signaling information from the data storage device 426, where the feed includes a batch of newly updated cached signaling information every five minutes, half hour, hour, or at any other suitable times. The received cached signaling information may indicate a plurality of attempted calls from one or more calling party providers, such as the calling party providers 412a-412n that were rejected or returned by one or more exchanges, such as the exchanges 415a-415p. In particular, the received cached signaling information may indicate cause codes, phone numbers, IP addresses, calling party provider identifications, etc. corresponding to the attempted calls.

A query may also be received (e.g., from a call router) indicating a specific called party for which a new connection is requested (block 492). For example, the call router 464 may send a query to the ingress call filter 460 based on a request from the calling party provider 462 to establish a connection with the called party. The query may include the request from the calling party provider 462 identifying the called party (e.g., by a phone number) and/or other information generated by the call router 464 identifying the called party. In any event, the received query indicates that the ingress call filter 460 should determine whether the request connection should be filtered.

It is then determined, based on cached signaling information, if the requested connection to the called party should be established or filtered (block 494), as further discussed with reference to FIG. 4C. Based on this determination, a response to the query is generated and sent to the call router (block 496). In this manner, the call router may selectively filter or establish requested connections, as further discussed with reference to FIG. 4D.

Figure 5A:
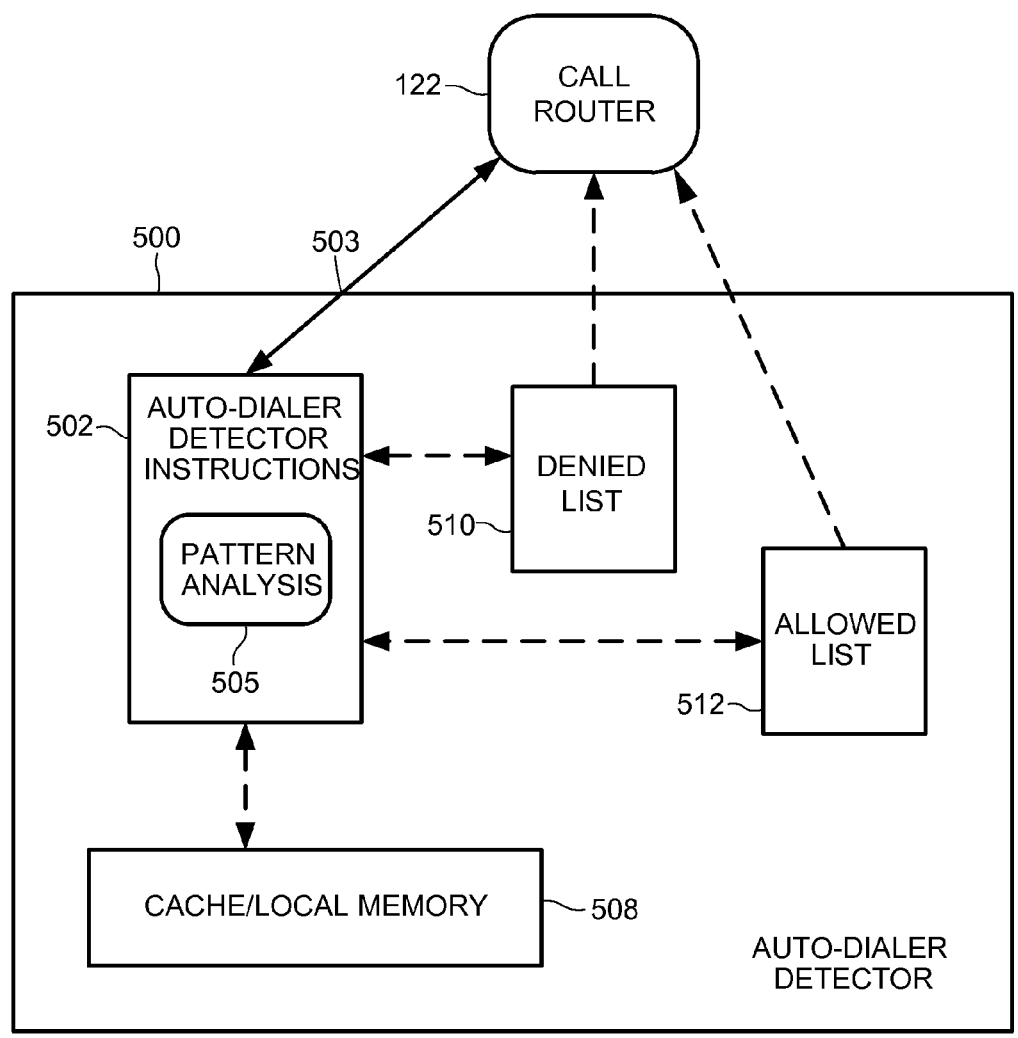
FIG. 5A illustrates a block diagram of an example auto-dialer detector that may be included in the communication system of FIG. 1.

Turning now to FIG. 5A, FIG. 5A depicts a block diagram of an example auto-dialer detector 500, which may be included in the communication system 100 or in another communication system. In an embodiment, the auto-dialer detector 500 may be the auto-dialer detector 130 of FIG. 1, and is described herein with simultaneous reference to FIG. 1 for ease of discussion. The term "auto-dialer," as used herein, generally refers to an electronic device or software that automatically dials telephone numbers. Typically, when a call initiated by an auto-dialer is answered, an auto-dialer plays a recorded message and/or connects the call to a live person. Auto-dialer initiated calls may decrease the efficiency of an inter-carrier network switch 102, as typically a high percentage of auto-dialer initiated calls are short in duration and may contribute to surcharges for short-duration calls, in a manner such as previously discussed with respect to the Call Extenders 125, 360, 332, and 324a-324n. Further, auto-dialer initiated calls may occupy resources of the inter-carrier network switch 102 (e.g., trunk groups) that have been sold or otherwise designated to service conversational calls, e.g., calls that are initiated by human beings.

Unlike the present disclosure, known auto-dialer detectors are not able to detect auto-dialers either in real-time or in near real-time. Rather, known auto-dialer detectors generally require a manually initiated or scheduled retrieval and analysis of historical call data records to determine the presence of auto-dialers. Thus, as known auto-dialer detectors must wait until calls have been completed and corresponding call data records have been generated and made available, known auto-dialer detectors are only able to perform off-line, delayed detection of auto-dialers. Consequently, this approach is especially vulnerable to auto-dialers that are able to frequently change Automatic Number Identifications (ANIs). Generally, as known in the art, an ANI is included in call signaling messages and indicates the calling party's telephone number (e.g., the calling party's billing telephone number), however, an ANI is not a caller identification (caller ID). As such, the ANI associated with a call may be captured or obtained even when a calling party has blocked caller identification (caller ID) features. The ANI of a call may also be referred to as the Calling Party Number (CPN) of a call.

On the other hand, embodiments of the auto-dialer detector 500, though, may automatically detect, either in real-time or in near real-time, auto-dialer initiated calls and may provide, in real-time or near real-time, alternate call treatment for such detected calls. In particular, the auto-dialer detector 500 may detect and provide alternate treatment of auto-dialer initiated calls as call origination attempts are received at the inter-carrier network switch 102.

To illustrate, with simultaneous reference to FIG. 1, the auto-dialer detector 500 may include a set of computer-executable instructions 502 that are stored on one or more memories or tangible, non-transitory computer-readable media or devices. The instructions 502, when executed by one or more processors, may cause the auto-dialer detector 500 to detect, without relying on analysis of historical call data records, auto-dialed calls that have been initiated or generated by a particular ANI (Automatic Number Identification).

For each incoming call origination or call attempt that is received at the call router 122 for processing, an ANI may be received in real-time by the auto-dialer detector 500, e.g., via a communicative connection 503 between the call router 122 and the set of auto-dialer detector instructions 502. The communicative connection 503 may include a link, a function call, a macro, a message exchange, a memory access function, an ethernet connection, and/or any suitable communicative interface. In an embodiment, at least a portion of the communicative received call attempt. connection 503 is included in the auto-dialer detector 500.

In an example, for each call origination attempt received at the inter-carrier exchange 102, the call router 122 may parse the incoming call origination, obtain the ANI indicated therein, and provide the ANI to the auto-dialer detector 500 using the communicative connection 503. In another example, for each call origination attempt received at the inter-carrier exchange 102, the call router 122 may invoke either a function or a filter to provide the ANI of each incoming call origination to the auto-dialer detector 500, where the function or filter serves as the communicative connection 503. At any rate, the call router 122 and/or the auto-dialer detector 500 may include a suitable mechanism 503 by which a respective indication of the ANI of each call origination is received by the auto-dialer detector 500 as the call router 122 processes each call origination.

In an embodiment, indications of ANIs corresponding to incoming call attempts are received by the auto-dialer detector instructions 502, and in response to the reception of the indications of the ANIs, the auto-dialer detector instructions 502 may cause a respective indication of a call attempt for each indicated ANI to be recorded in real-time or in near real-time at a cache or other temporary, local memory storage 508. For example, for a particular ANI included in a received call attempt, the auto-dialer detector 502 may cause a corresponding count, code, flag, tag, entry, or another suitable identifier corresponding to the particular ANI to be created or updated in the cache 508. As such, the cache 508 may maintain an indication of a current number of call attempts for the particular ANI, and the current number is immediately updated in response to receiving the indication of the received call attempt including the particular ANI. Indeed, the cache 508 may maintain a current, respective indication of a respective number of call attempts for each of a plurality of ANIs included in one or more calls that have been received by the inter-carrier network exchange 102.

The auto-dialer detector instructions 502 may also cause the auto-dialer detector 500 to perform a pattern analysis 505 on the contents of the cache 508. In an embodiment, the pattern analysis 505 may include analyzing, in real-time or in near real-time, the current contents of the cache 508 to determine a set of ANIs for which a pre-determined number of call originations that have been attempted or that have been received at the inter-carrier network switch 102 within a pre-determined time period or interval. For instance, the pattern analysis 505 may determine a set of ANIs, where each ANI included in the set is associated with forty or more call attempts having been made in the last minute. As such, the pre-determined number of call originations with respect to the pre-determined time period or interval may be a call attempt threshold, and when a number of calls from a particular ANI exceeds the call attempt threshold, the particular ANI may be determined, detected, or considered to be an auto-dialer. The ANIs that are determined to be auto-dialers may be indicated as such, e.g., indications of the ANIs determined to be auto-dialers may be added to a Denied List 510, or may be otherwise indicated to be auto-dialers. Of course, the Denied List 510 need not be implemented as an actual list, but may be implemented in any suitable manner, such as by associating a tag, flag, or value with an ANI that has been determined to be an auto-dialer.

The pre-determined time period or time interval may be a sliding window of time, where an endpoint or ending time of the sliding window coincides with a time at which the auto-dialer 500 receives (e.g., via the communicative connection 503) an indication of the receipt of a next call origination at the inter-carrier network switch 102. As such, the sliding window of time may be determined, in real-time or in near real-time, based on a reception of a next, currently, or most recently received incoming call at the inter-carrier network switch 102.

Further, a length or duration of the sliding window of time may be a pre-determined, configurable length, e.g., one minute, less than five minutes, etc. For example, the length of the sliding window of time may be configured, e.g., to reflect the preferences of a customer of the inter-carrier network switch 102, or as desired by the provider or operator of the inter-carrier network switch 102. In an embodiment, different time periods, time intervals, or sliding windows may be utilized by the instructions 502 for different customers or vendors of the inter-carrier network switch 102. In an embodiment, different time periods, time intervals, or sliding windows may be utilized by the instructions 502 for different times of the day and/or for different days of the week. For example, a customer may designate a shorter sliding window during dinner time, on weekdays, or during the week prior to an election. Thus, a length or a duration of the sliding window of time may be configurable based on a time of day, a date, a customer of the inter-carrier network switch 102, a user input, and/or based on other suitable criteria. Generally, after the time period or interval has expired, or after the sliding window has passed, entries that were added to the cache 508 prior to the start of the time period, interval, or sliding window may be deleted from the cache 508, e.g., by the auto-dialer detector instructions 502.

Similar to the pre-determined time period or sliding window, the call attempt threshold (e.g., the pre-determined number of calls received during the pre-determined time period over which a particular ANI is determined to be an auto-dialer) may be configurable, e.g., to reflect the preferences of a customer or vendor of the inter-carrier network switch 102, or as desired by the provider or operator of the inter-carrier network switch 102. In an embodiment, different thresholds may be utilized by the instructions 502 for different customers of the inter-carrier network. In an embodiment, different time period or intervals may be utilized by the instructions 502 for different times of the day and/or for different days of the week. For example, a customer may designate a lower call attempt threshold during dinner time, on weekdays, or during the week prior to an election. Accordingly, a call attempt threshold may be configurable based on a time of day, a date, a customer of the inter-carrier network switch 102, a user input, and/or based on other suitable criteria.

The Denied List 510 may be utilized by the call router 122 and/or by the auto-dialer detector instructions 502 to filter detected auto-dialer generated call originations. Specifically, for each received call attempt, the call router 122 may determine whether or not the ANI of the received call attempt is included on the Denied List 510, for example, by directly accessing the Denied List 510 or by requesting the auto-dialer detector instructions 502 to access the Denied List 510. If the ANI is not on the Denied List 510, the received call attempt is processed by the call router 122 for delivery through the inter-carrier network switch 102. If the ANI is on the Denied List 510, then the received call attempt may not be routed by the inter-carrier network switch 102 and an alternate or alternative call treatment may be pursued. For example, for an ANI on the Denied List 510, a corresponding received call attempt may be explicitly blocked (e.g., by using a response code indicating "invalid,"), the received call attempt may be replied to using a code that prompts the preceding network to re-route the call (e.g., a code indicating "not able to complete call"), or the received call attempt may simply be dropped.

In an embodiment, the auto-dialer detector 500 may manage and/or utilize multiple Denied Lists 510, and different Denied Lists 510 may be utilized for different customers of the inter-carrier network switch 102. For example, different filters based on customer-specific Denied Lists 510 may be utilized to screen incoming calls. Additionally or alternatively, different alternative call treatments may be utilized on a per-customer or other desired basis. The types and occasions on which specific alternative call treatments are utilized may be specified, e.g., by the customer or by the provider/operator of the inter-carrier network switch 102.

Each ANI indicated in the Denied List 510 may have a finite time to live (TTL) before it is deleted from the Denied List 510, e.g., before it is deleted by the auto-dialer detector instructions 502. The TTL of an ANI indicated in the Denied List 510 may be pre-determined and may be configurable, e.g., to reflect the preferences of a customer of the inter-carrier network switch 102, or as desired by the provider or operator of the inter-carrier network switch 102. In an embodiment, different TTLs may be utilized by the instructions 502 for different customers, and/or for different sets of ANIs. In some situations, the TTL of an ANI that is indicated on the Denied List 510 may be determined based on the length of a corresponding sliding window and/or on a corresponding call attempt threshold. A TTL period of a particular ANI may be reset before its expiration, for example, when the number of call attempts initiated by the particular ANI again exceeds the pre-determined call attempt threshold during a subsequent sliding window occurring prior to the expiration of the TTL of the particular ANI.

In some embodiments, a particular ANI may be added in a persistent manner to the Denied List 510. For example, a customer or other user may indicate that the particular ANI is to persist on the Denied List 510 for a particular TTL (e.g., that is longer than other TTLs, and that may be configurable), or the customer or other user may indicate that the particular ANI is to persist on the Denied List 510 until a user indicates that the particular ANI is to be removed from the Denied List 510. In such cases, the persistent presence of the particular ANI on the Denied List 510 may override the real-time pattern analysis 505 or other analysis of the contents of the cache 508. For example, if the particular ANI is a persistent member on the Denied List 510, then any incoming calls indicating said particular ANI may be automatically denied without having to access the contents of the cache 508.

Thus, in view of the above discussion, the auto-dialer detector 500 may be configured to perform real-time pattern analysis and/or self-learning 505 on the cache contents, so that for any moment in time within the pre-determined time interval, time period, or sliding time window, the Denied List 510 may indicate the ANIs that have been determined or detected to be auto-dialers, and optionally, the Denied List 510 may also indicate persistently denied ANIs. The non-persistent or more temporal contents of the Denied List 510 may be current for the pre-determined time interval, time period, or sliding time window immediately preceding the most recently received call attempt. For example, if the sliding time window is defined as one minute, the Denied List 510 includes the ANIs of all auto-dialers that have been detected (and in some cases, that have been re-verified as being auto-dialers) within the one minute immediately preceding the reception of a most recently received call origination.

In some embodiments, the auto-dialer detector 500 includes an Allowed List 512. Calls having ANIs included on the Allowed List 512 may be allowed to proceed and be serviced by the inter-carrier network switch 102 irrespective of a comparison of the number of call attempts that have been received with those ANIs during the pre-determined period of time. ANIs may be specifically placed onto the Allowed List 512, e.g., per customer indication and/or by the indication of the provider/operator of the inter-carrier network switch 102. For example, ANIs associated with an airline may be included on the Allowed List 512 so that flight delays and other notification alerts may be broadcast to airline passengers by auto-dialers without being blocked. In an embodiment, the auto-dialer detector 500 may manage and/or utilize multiple Allowed Lists 512, and different Allowed Lists 512 may be utilized for different customers of the inter-carrier network switch 102. For example, different filters based on customer-specific Denied Lists 510 as well as customer-specific Allowed Lists 512 may be utilized by the auto-dialer detector instructions 502 and/or by the call router 122 to screen incoming calls. Additionally, similar to Denied List 510, the Allowed List 512 need not be implemented as an actual list, but may be implemented in any suitable manner, such as by associating a tag, flag, or value with an ANI that has been determined to be an allowed ANI.

Further, also similar to the Denied List 510, a particular ANI included on the Allowed List 512 may persist for a pre-defined, respective TTL (which may be configurable), or the particular ANI may persist on the Allowed List 512 until a user indicates otherwise. In such cases, the presence of the particular ANI on the Allowed List 512 may override the real-time pattern analysis 505 or other analysis of the contents of the cache 508. For example, if the particular ANI is a persistent member of the Allowed List 512, then any incoming calls indicating said particular ANI may be automatically further processed by the inter-carrier switch 102 without having to access the contents of the cache 508.

Figure 5B:
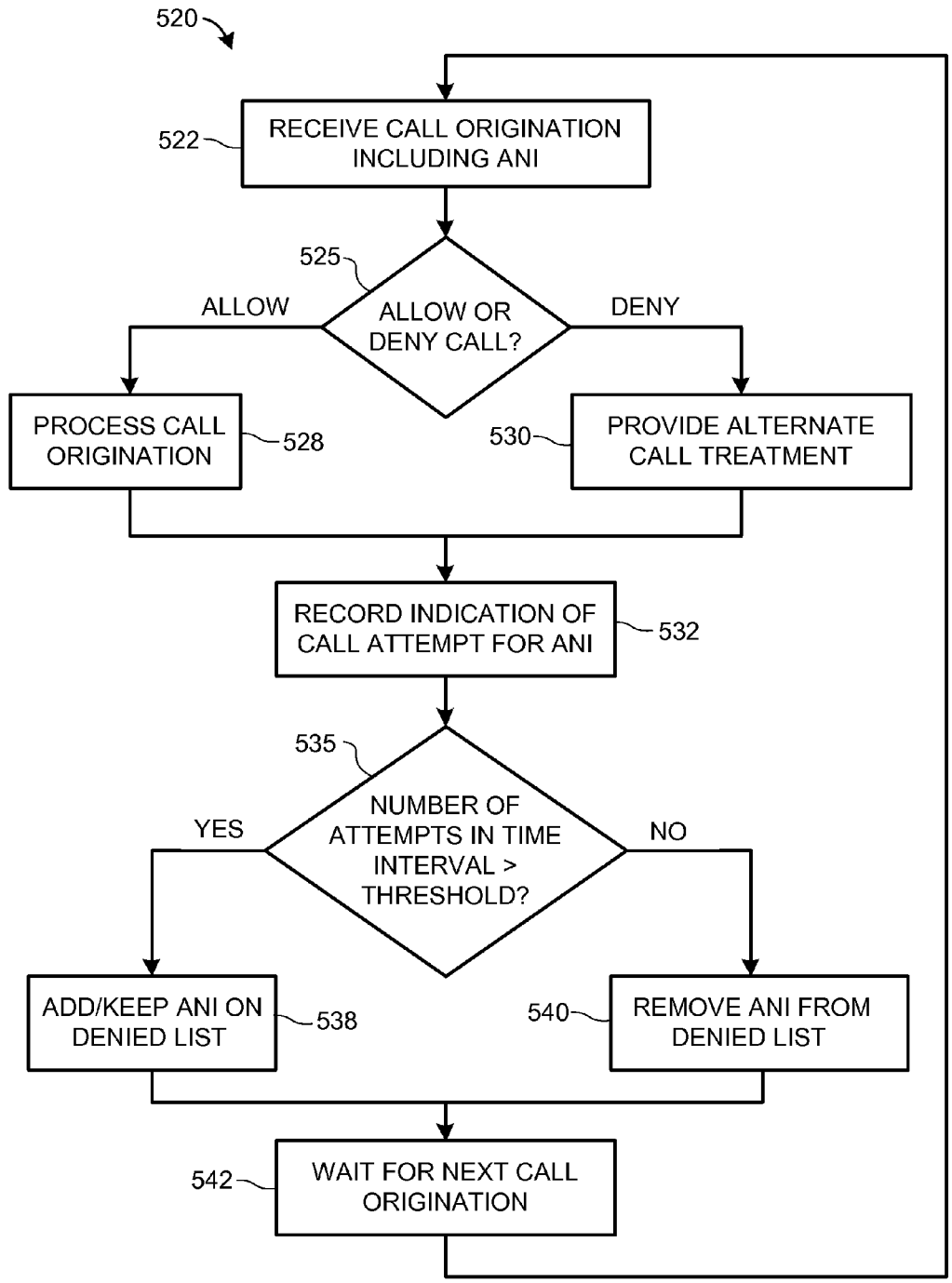
FIG. 5B is a flow diagram of an example method of detecting auto-dialed calls that may be included in the communication system of FIG. 1.

FIG. 5B illustrates a flow diagram of an example method 520 for detecting auto-dialed calls. In an embodiment, the method 520 may be performed by or in conjunction with an inter-carrier exchange of a communication system, such as the inter-carrier exchange 102 of the system 100 of FIG. 1, or the method 520 may be performed by or in conjunction with another system. For example, the method 520 may be performed at least in part by the auto-dialer detector 130 of FIG. 1, the auto-dialer detector 500 of FIG. 5A, the auto-dialer detector instructions 502 of FIG. 5A, and/or the call router 122 of FIG. 1. However, while the method 520 is described below with simultaneous reference to FIGS. 1 and 5A for ease of discussion, nonetheless it is understood that the method 520 may be performed by a device, apparatus or system other than the auto-dialer detector system 130 of FIG. 1, the auto-dialer detector 500 of FIG. 5A, the auto-dialer detector instructions 502 of FIG. 5A, or the call router 122 of FIG. 1.

At a block 522, a call origination, incoming call, or call attempt may be received. The call may be a voice call or a data call, and the call origination may be received, for example, by a call router 122 of an inter-carrier network switch or exchange 102. The call origination may include or indicate a particular ANI corresponding to an initiator or originator of the call.

At a block 525, the method 520 may include determining whether or not the call origination is to be allowed or denied. In an embodiment, the call router 122 may determine whether or not the call origination is to be allowed or denied based on the ANI of the call origination and based on the contents of the cache 508 or suitable call attempt storage area. For example, the call router 122 may query the auto-dialer detector 130 for an indication as to whether calls from the ANI are to be allowed or denied. Additionally or alternatively, the call router 122 may directly access the Denied List 510 and/or the Allowed List 512 to determine whether calls from the ANI are to be presently allowed or denied.

In an embodiment, the method 520 may include performing, based on the ANI corresponding to the call origination, a real-time pattern analysis 505 on the contents of the cache 508 (not shown in FIG. 5B). For example, at the block 525, the call router 122 may provide an indication of the ANI corresponding to the call origination to the auto-dialer detector 502. Using the ANI, the auto-dialer detector 502 may perform a real-time pattern analysis 505, and based on the results of the analysis 505, the auto-dialer detector 502 may provide, to the call router 122, an indication of whether or not the call origination is allowed to be processed and/or routed by the inter-carrier network switch 102 (e.g., by using the PPNBE 200). For instance, the auto-dialer detector 502 may provide, to the call router 122 via the communication connection 503, an "allowed" indication or a "denied" indication with respect to the call including the ANI.

In some configurations, the determination of the allowance or denial of further processing and/or routing of the call origination (block 525) using the inter-carrier switch 102 and/or the PPNBE 200 included therein is based on a Denied List 510 and/or on an Allowed List 512. The Denied List 510 may indicate one or more ANIs for which calls originating or initiating therefrom are to be denied or blocked, and the Allowed List 512 may indicate one or more ANIs for which calls originating or initiating therefrom are to be explicitly allowed. An ANI that is to be explicitly denied or blocked may have been added to the Denied List 510 when a number of call attempts from the each ANI exceeded a pre-determined threshold during a pre-determined time interval, time period, or sliding window of time, or when explicitly added to the List 510 by a user, such as in a manner such as previously described with respect to FIG. 5A. An ANI that is to be explicitly allowed may be added to the Allowed List 512, e.g., based on a manual action or other indication.

In an embodiment, the Denied List 510 and/or the Allowed List 512 are consulted or accessed (e.g., by the call router 122 and/or by the auto-dialer detector 502) prior to performing any pattern analysis 505 or other examination of the contents of the cache 508. If the subject ANI is included on the Denied List 510, the call origination may automatically be denied without having to perform any in-line examination or analysis of the cache contents 508. Similarly, if the subject ANI is included on the Allowed List 512, the call origination may automatically be allowed without having to perform any in-line examination or analysis of the cache contents 508. In such an embodiment, the Denied List 510 and/or the Allowed List 512 are independent of the real-time pattern analysis 505 or are irrespective of the cache contents 508. As such, in this embodiment, the Denied List 510 and/or the Allowed List 512 override, supersede, or have precedence over the of the contents of the cache 508 and any analysis thereof.

It is noted that different configurations of the auto-dialer detector system 500 may utilize the cache 508, the Denied List 510, and/or the Allowed List 512 differently to achieve efficiencies. In one example configuration, a system 500 may exclude any Denied 510 and Allowed 512 Lists, and may determine the allowance or denial of each call attempt solely by a respective real-time analysis of the cache 508 performed during the respective call flow.

In an example configuration, the system 500 may include the cache 508 and a Denied List 510, but may omit the Allowed List 512. In such a configuration, if the ANI of the incoming call is included on the Denied List 510, then the call may be automatically denied and may not be further processed or routed through the switch 102 to any terminating exchange. For some embodiments of this configuration, if the ANI of the incoming call is excluded from the Denied List 510, then the pattern analysis 505 or other suitable analysis of the contents of the cache 508 may be performed (e.g., in-line with the call flow) to determine whether the call is to be allowed or denied.

For other embodiments of this configuration, though, if the ANI of the incoming call is excluded from the Denied List 510, the call may automatically allowed to be processed, e.g., all calls are allowed to be further processed unless their ANIs are on the Denied List 510. In such embodiments, the auto-dialer detector 502 may update (e.g., write to) the Denied List 510 in real-time and independent of the call flow (except for being initially triggered by the reception of a call), and the call router 122 may directly access (e.g., read from) the Denied List 510 during a call flow to determine the call's allowance or denial without requiring any examination/analysis of current cache contents 508 to be performed in-line during the call flow.

In an alternate example configuration, the system 100 may include the cache 508 and the Allowed List 512, but may omit the Denied List 510. In such a configuration, if the ANI of the incoming call is included on the Allowed List 512, the call may be automatically processed through the inter-carrier network switch 102 to a suitable terminating exchange. For some embodiments of this configuration, if the ANI of the incoming call is excluded from the Allowed List 512, then the pattern analysis 505 of other suitable analysis of the cache 508 may be performed to determine allowance or denial of the call. For other embodiments of this configuration, though, if the ANI of the incoming call is excluded from the Allowed List 512, the call may be automatically denied, e.g., all calls are denied from being further processed unless their ANIs are on the Allowed List 512. In such embodiments, the auto-dialer detector 502 may update (e.g., write to) the Allowed List 512 in real-time and independent of the call flow (except for being initially triggered by the reception of the call), and the call router 122 may directly access (e.g., read from) the Allowed List 512 during a call flow to determine the call's allowance or denial without requiring any examination/analysis of current cache contents 508 to be performed in-line during the call flow.

Indeed, in some configurations, the call router 122 may have read (but not write) permissions to the Allowed List 512 and/or to the Denied List 510, while the auto-dialer detector instructions 502 may have read/write permissions so as to maintain the contents of the Allowed List 512 and/or the Denied List 510 based on real-time analyses (e.g., analysis 505) of the cache 508 that are triggered in real-time by the reception of call attempts, but are otherwise independent of call flows. In other configurations, the call router 122 may not have read permissions to the Allowed List 512 and/or to the Denied List 510, and the auto-dialer detector instructions 502 accesses the Allowed List 512 and/or the Denied List 510 in-line with a call flow to instruct the call router 122 whether to allow or deny the call, e.g., by providing an allowed indication or a denied indication for the ANI of the call.

Returning now to the method 520, If a call corresponding to the particular ANI of the received call origination is determined (block 525) to be allowed, then the method 520 may include further processing or routing the received call origination (block 528), e.g., by using the inter-carrier network switch 102. For example, the call router 122 may further process or route the call origination by determining or selecting one of a plurality of terminating vendor exchanges 118a-118n to service the call, and may route the call through the inter-carrier network switch 102 to be delivered to the determined/selected terminating exchange.

If the call corresponding to the particular ANI of the received call origination is determined (block 525) to be denied, the method 520 may include denying the received call origination (block 530) from further processing or routing through the switch 102. For example, the method 520 may not process and may not route the call origination through the inter-carrier network switch 102 to any terminating exchange. Further, in some cases, the method 520 may provide alternate or alternative call treatment (block 530) for the call origination. For example, the method 520 may cause a response to be delivered to the exchange from which the call origination was received, and the response may indicate therein an indication of an inability to complete the call (e.g., a code or field indicating "invalid," "blocked," "unable to complete," "re-route," etc.). Alternatively, at the block 530, the method 520 may ignore or drop the received call origination. In some embodiments, the particular alternate call treatment that is to be applied a particular denied call may be configurable, e.g., on a per ANI basis, a per vendor basis, a per customer basis, and/or some other basis.

Further, irrespective of whether the call is determined (block 525) to be allowed or denied, the method 520 may include causing an indication of a call attempt associated with the particular ANI and received at the switch 102 (e.g., as per block 522) to be recorded (block 532). For example, an indication of a call attempt associated with the particular ANI may be added to a local cache or memory, such as the local cache or memory 508 of FIG. 5A. Significantly, this local recordation may be different than and independent from a call data record being recorded in the CDR data storage entity 135. In particular, the local call attempt recordation (e.g., into a local cache or memory 508 that is read and write accessible in real-time to the auto-dialer detector instructions 502) may be performed for every call attempt that is received at the inter-carrier network switch 102. Generally, as known in the art, a call data record is generated and stored for each call that is processed, at least partially, by a switch or exchange, and typically, the CDR is generated a posteriori or during the tear down of the call. On the other hand, indications of call attempts from particular ANIs and received at the switch 102 may be generated and stored upon reception of the call attempt, irrespective of whether the call attempt is eventually processed through switch 102 or not. Thus, in a sense, at block 532, call attempt indications are generated and stored a priori for calls that are allowed and eventually processed, at least partially, by the switch 102, as well as for call for calls that are denied and not further processed by the switch 102. Of course, for call attempts that are allowed and eventually processed, at least partially, by the switch 102, corresponding CDRs may also be generated and stored, e.g., in historical CDR storage entity 135.

The local storage of the indication of the call attempt corresponding to the particular ANI may take any suitable form, as previously discussed with respect to FIG. 5A. In some embodiments, the call router 122 may store the indication of the call attempt, and in some embodiments, the auto-dialer detector 130 may store the indication of the call attempt. In some cases, an indication of the call attempt is stored (block 532) prior to a real-time analysis (e.g., the pattern analysis 505) of the contents of the cache 508, and in other cases, and indication of the call attempt is stored (block 532) after the allowance or the denial of the call attempt has been determined. As such, in some embodiments, the analysis 505 may be performed based on all call attempts including the reception of the present call attempt, and in other embodiments, the analysis 505 may be performed based on call attempts received up to but excluding the reception of the present call attempt.

At a block 535, the method 520 may include determining if a total number of call attempts associated with the particular ANI that have occurred within a pre-determined time interval, time period, window of time, or sliding window of time is greater than a threshold, e.g., a call attempt threshold. The block 535 may be included in the real-time time determination of whether or not a call is to be allowed or denied (e.g., the block 535 may be included in the block 525), or the block 535 may be performed independently of a real-time call flow (e.g., the execution of the block 535 may be periodically performed in the background, or the execution of the block 535 may be triggered by a reception of the corresponding call). In an embodiment, the determination 535 may be made by accessing the contents of the cache 508 and performing, based on the particular ANI, a real-time pattern analysis 505 on the cache contents 508. If the total number of call attempts from the particular ANI received during the pre-determined time interval, time period, or sliding window of time is greater than a respective call attempt threshold, the indication of the particular ANI may be added to or maintained on the Denied List 510 (block 538). Subsequently, in an embodiment, if a future call origination having the particular ANI is received, based on the presence of the particular ANI on the Denied List 510, the future call origination may be denied or blocked from being processed by or routed through the switch 102 (e.g., by using the PPNBE 200) to any terminating exchange.

However, if at the block 535 the method 520 determines that the total number of call attempts from the particular ANI received during the pre-determined time interval, time period, or sliding window of time is not greater than the threshold, then the indication of the particular ANI may be removed from the Denied List 510 (block 540). For example, the sliding window of time may advance so that the total number of call attempts from the particular ANI received during the advanced sliding window is less than the respective call attempt threshold. Subsequently, if a future call origination having the particular ANI is received, based on the particular ANI not being indicated on the Denied List 510, the future call origination may be allowed to be processed by or routed through the switch 102 (e.g., by using the PPNBE 200) to a suitable terminating exchange.

In a configuration in which a system 500 does not include a Denied List 510, instead of the block 538, the method 520 may include providing an indication of a denial, e.g., to the call router 122. Similarly, in this configuration, instead of the block 540, the method 520 may include providing an indication of an allowance, e.g., to the call router 122.

While the blocks 538 and 540 are described above with respect to the Denied List 510, it is noted that the method 520 may be similarly and easily adapted for systems 500 that include an Allowed List 512, and/or that include both an Allowed List 512 and a Denied List 510.

The method 520 may then wait for another call origination to be received (block 542), and may return to the block 522 upon the reception of a next call origination.

It is noted that any portion of the method 520 may be performed by the call router 122 and/or by the auto-dialer detector 500. For example, any one or more of the blocks 522, 525, 532 and 542 may be performed by the call router 122 and/or by the auto-dialer detector 500. Typically, but not necessarily, the blocks 528 and 530 may be performed by the call router 122. Typically, but not necessarily, the blocks 535-540 may be performed by the auto-dialer detector 500. For example, in an embodiment, the call router 122 may perform blocks 522-530, while the auto-dialer detector 500 may be triggered by the call router 122 to perform the blocks 532-540. In another embodiment, the call router 122 may perform blocks 522, 528 and 530, while the auto-dialer detector 500 performs the blocks 525 and 532-540, at least some of which may be performed by the auto-dialer detector 500 in synchronization with the call router 122 in-line during the call flow.

Still further, as previously mentioned, in some embodiments, the blocks 535-540 may be performed prior to performing the block 525; in some embodiments, the blocks 535-540 may be performed as part of the block 525; and in some embodiments, the blocks 535-540 may be performed after the block 525 has been performed. Similarly, in some embodiments, the block 532 may be performed prior to performing the block 525; in some embodiments the block 532 may be performed as part of the block 525; and in some embodiments, the block 532 may be performed after the block 525 has been performed.

Of course, other embodiments of the method 520 may be possible.

Figure 6A:
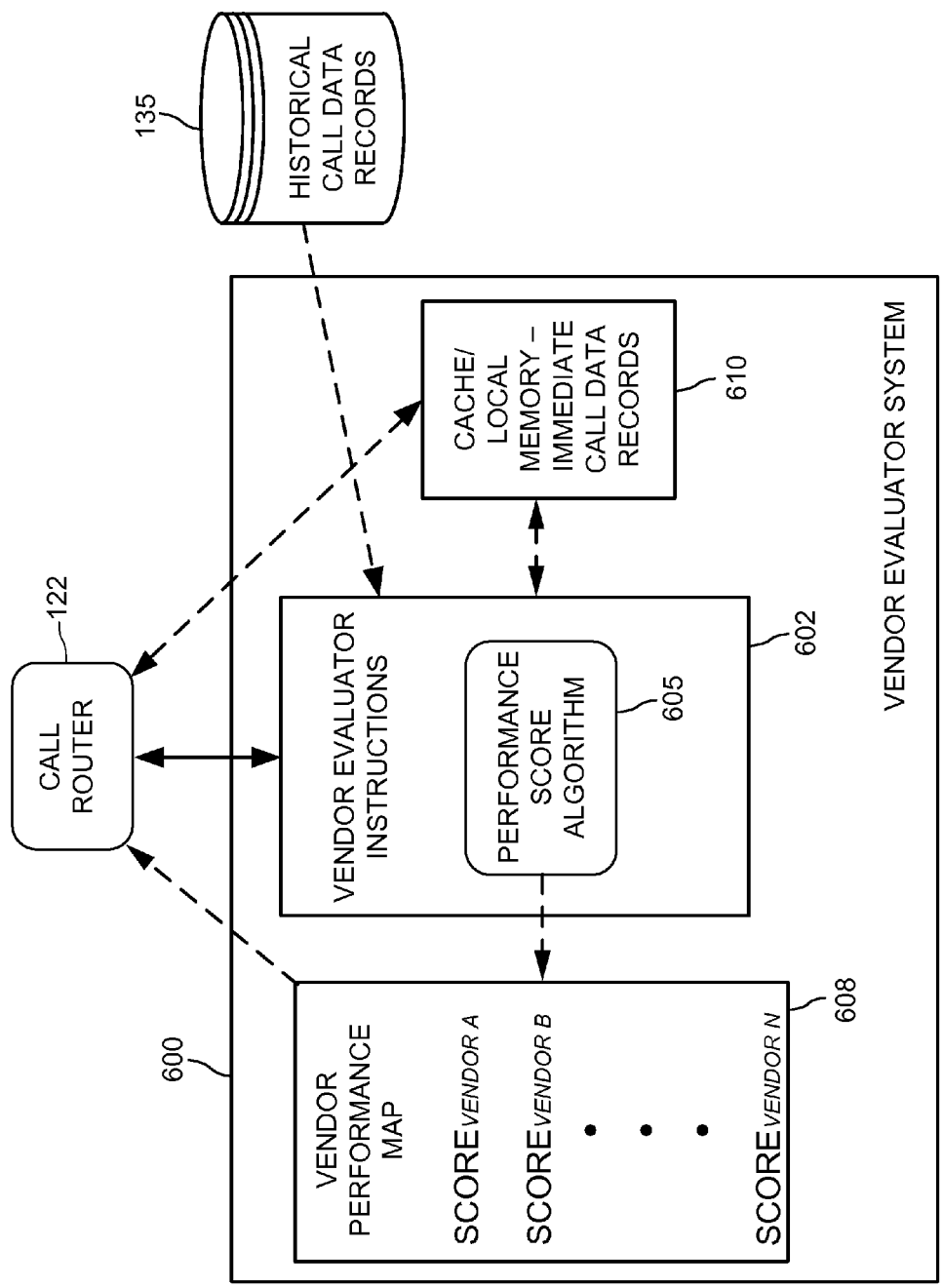
FIG. 6A illustrates a block diagram of an example system for delivering calls based on up-to-date, real-time or near real-time vendor performance.

Turning now to FIG. 6A, FIG. 6A depicts a block diagram of an example vendor evaluator system 600 for delivering calls based on up-to-date, real-time or near real-time vendor performance. The vendor evaluator system 600 may be included in the communication system 100 or in another communication system. In an embodiment, the system 600 may be included in the vendor evaluator 132 of FIG. 1, and is described herein with simultaneous reference to FIG. 1 for ease of discussion. The vendor evaluator system 600 may automatically monitor the respective performance of vendor providers, networks or exchanges 118a-118n, and may automatically route incoming calls 108c based on the real-time or near real-time performances of the vendors 118a-118n. Generally, the vendor evaluator system 600 may monitor vendor performance based on an analysis of current, real-time or near real-time performance indicators such as post-dial delay (PDD), attempt-seizure ratio (ASR), and average call hold time (ACHT) of each vendor.

To illustrate, with simultaneous reference to FIGS. 1 and 6A, the vendor evaluator system 600 may include a set of computer-executable instructions 602 (e.g., vendor evaluator instructions 602) that are stored on one or more memories or tangible, non-transitory computer-readable media or devices. The vendor evaluator instructions 602, when executed by one or more processors, may cause the vendor evaluator system 600 to determine and monitor the performance of one or more vendor providers, exchanges, or networks 118a-118n to which an inter-carrier switch 102 may terminate voice or data calls. Additionally, the vendor evaluator instructions 602, when executed, may enable the call router 122 to route incoming calls to vendors 118a-118n based on current vendor performance.

Specifically, the vendor evaluator instructions 602 may obtain data indicative of the performance of one or more vendors 118a-118n. The performance data may be obtained, for example, from the historical call data records 135, and/or incrementally as calls are completed (e.g., from the call router 122 or other call control entity within the inter-carrier switch 102). For example, the vendor evaluator instructions 602 may obtain the post-dial delays (PDD) of calls serviced by a particular vendor during the most recent periodic or incremental time interval. PDD, as commonly known in the art, generally reflects the time from a calling party dialing the last digit of a called number to the time that the calling party hears ringing. Further, the vendor evaluator instructions 602 may additionally or alternatively obtain the attempt-seizure ratios (ASRs) of the calls serviced by the particular vendor during the most recent periodic or incremental time interval. ASR, as known in the art, generally reflects a ratio between call attempts answered and call attempts made. Still further, the vendor evaluator instructions 602 may additionally or alternatively obtain the average length of calls (e.g., average call hold time or ACHT) serviced by the particular vendor during the most recent periodic or incremental time interval, and/or the vendor evaluator instructions 602 may obtain other desired data indicative of the performance of the particular vendor. Generally, the most recent periodic or incremental time interval, as used herein, generally refers to a periodic or incremental time interval that occurred immediately preceding a particular moment in time. The vendor evaluator instructions 602 may obtain the PDD, ASR, and/or ACHT by calculating or determining said performance values from call data generated during the most recent periodic or incremental time interval, or another entity within the system 100 may calculate or determine said performance values and may make the calculated/determined performance values available to the vendor evaluator instructions 602.

The vendor evaluator instructions 602 may utilize the performance data (e.g., PDD, ASR, ACHT, and optionally other types of performance data) in an algorithm 605 that generates a respective performance score for each of the vendors 118a-118n, e.g., for each of the vendor exchanges 118a-118n connected to the inter-carrier switch 102 and to which the switch 102 may route calls for termination or further routing. The performance scores of the vendors 118a-118n may be stored in a vendor performance map 608, or otherwise may be made available for use by the call router 122. The vendor performance map 608 may be stored on the same one or more memories, computer-readable media, or devices as the vendor evaluator instructions 602, or the vendor performance map 608 may be stored on a different set of one or more memories or tangible, non-transitory computer-readable media or devices.

In an embodiment, the performance score algorithm 605 may be a weighted average algorithm based on PDD, ASR, and ACHT (and optionally other types of performance data). In an embodiment, the PDD may be weighted most heavily, as the PDD is most likely to identify significant vendor network performance issues, such as looping and/or capacity issues. On the other hand, the respective weightings of the ACHT and the ASR within the algorithm 605 may each be less than the weighting of the PDD. In some situations, the respective weightings of the ACHT and the ASR each may be dependent on an amount of auto-dialer initiated traffic through the system 100. For example, in a system that services a lesser amount of auto-dialer initiated traffic (e.g., in a system that includes the auto-dialer detector 130), the respective weightings of the ACHT and/or of the ASR may be heavier as compared to the respective weightings of the ACHT and/or of the ASR in a system that services a greater amount of auto-dialer initiated traffic (e.g., in a system that omits or disables the auto-dialer detector 130).

In an embodiment, the algorithm 605 to generate a performance score 608 indicative of the performance of a particular vendor network, exchange or switch v (e.g., one of vendors 118a-118n) may be represented by the expression:

$$\text{score}_v = (1/\$PDD*a) + (\$ACHT*b) + (\$ASR*c), \quad (1)$$

where $PDD represents the currently observed or calculated value of the PDD of the vendor v, $ACHT represents the currently observed or calculated value of ACHT of the vendor v, and $ASR represents the currently observed or calculated value of ASR of the vendor v. In an embodiment, a, b, and/or c may be constant values. In an embodiment, a, b, and/or c may be functions. For example, as discussed above, the value of b and/or the value of c may be determined based on an average amount of auto-dialer initiated traffic that is serviced by the system 100, by the inter-carrier network switch 102, and/or by the vendor exchange 118a-118n. In some cases, a value of a may be greater than a value of b, and a value of a may be greater than a value of c. In some cases, additionally a value of c may be greater than a value of b.

As PDD may be weighted more heavily than ACHT and may be weighted more heavily than ASR, in just one of many examples of the performance score algorithm 605, a>20*b and/or a>10*c. For instance, a=150, b=6, c=15, and the performance score algorithm 605 may be represented by:

$$\text{score}_v = (1/\$PDD*150) + (\$ACHT*6) + (\$ASR*15). \quad (2)$$

Of course, the above examples are illustrative only, and other values and/or functions may be utilized for a, b, and/or c of Equation (1) to determine a particular vendor's performance score.

Further, in some embodiments, multiple performance score algorithms 605 may be included in or utilized by the vendor evaluator instructions 602. For example, the vendor evaluator instructions 602 may utilize or include different performance score algorithms 605 for different customers of the inter-carrier switch 102 (e.g., the long distance provider 115 and/or other customers for whom the switch 102 routes calls). In some embodiments, the vendor performance score algorithm 605 may not be a weighted average algorithm but may nonetheless be based on PDD, ASR, and ACHT. In some embodiments, performance data other than PDD, ASR, and ACHT may be additionally or alternatively utilized in the vendor performance score algorithm 605.

In an embodiment, the vendor evaluator instructions 602 may utilize the algorithm 605 to generate a performance score 608 for a particular NPA-NXX of a particular vendor or vendor exchange. "NPA-NXX," as is commonly known, may be a code that indicates a Numbering Plan Area Code and a central office exchange code corresponding to a particular exchange, and is commonly utilized for exchanges located in Canada, the United States, and some islands in the Caribbean, Atlantic, and Pacific. A particular exchange may be mapped to one or more NPA-NXX codes, each of which is indicative of the particular exchange. Accordingly, in such an embodiment, the performance score algorithm 605 utilized by the vendor evaluator system 600 (e.g., that is utilized by the vendor evaluator instructions 602 of the system 600) may be represented by the expression:

$$\text{score}_{(v,NPA-NXX)} = (1/\$PDD*a) + (\$ACHT*b) + (\$ASR*c), \quad (3)$$

and, with Equation (3), a respective performance score 608 for every NPA-NXX of a particular vendor exchange v may be generated. Indeed, in an embodiment, the vendor evaluator instructions 602 may generate a respective performance score 608 for every NPA-NXX of every vendor exchange of every vendor 118a-118n.

The duration of the time interval over which performance data of the vendors 118a-118n is analyzed to generate (and/or update) vendor performance scores 608 may be configurable. As discussed above, in some embodiments, the time interval may be periodic so that performance data values (e.g., PDD, ASN, ACHT, etc.) of each of the vendors 118a-118n (and/or of the NPA-NXX codes associated with at least some of the vendors 118a-118n) are regularly calculated and/or generated. As such, a complete, updated snapshot of the performance of all vendors 118a-118n (and/or of their respective NPA-NXX codes) corresponding to the system network 100 may be generated at regular intervals of time. That is, a complete, updated vendor performance map 608 may be regularly generated upon expiration of a periodic time interval. This complete, updated vendor performance map 608 or vendor network snapshot may be utilized by the call router 122 to route incoming calls. Preferably, the duration of the periodic/regular time interval may be less than fifteen minutes. For example, the duration of the periodic/regular time interval may be less than five minutes, or may be less than one minute. The duration of the periodic/regular time interval may be modified in real-time, if desired, and may be adapted for different times of the day, for different events, or for other reasons. In an embodiment, a duration or a length of the time interval may be configured by a user. It is noted that, in some situations, the time interval need not be periodic. For example, the call data from a most recent time interval may be additionally or alternatively obtained analyzed to update the vendor performance map 608 per a user request.

In an embodiment, the performance data may be obtained and analyzed in a batch mode. For example, for each period (e.g., every 15 minutes, or every configured time interval), historical performance data of the vendors 118a-118n may be pulled or pushed from the historical call data records 135 of the inter-carrier exchange 102, updated performance values (e.g., PDD, ASN, ACHT, etc.) may be determined or calculated from the historical call data, and the performance score 608 generating algorithm 605 may update the respective performance scores 608 of the vendors 118a-118n (and optionally of their corresponding NPA-NXXs), e.g., based on the updated performance values.

In an embodiment, the performance data may be obtained and analyzed in an incremental mode, e.g., on a per-call basis. For example, as each call being routed by the inter-carrier switch 102 is released, the vendor evaluator system 600 may obtain the respective call data for the released call (e.g., prior to the call data being historized or stored in the historical call data records 135, or as the call data is being historized/stored in the historical call data records 135). The vendor evaluator instructions 602 may utilize the respective call data of the released call to incrementally update current performance data values (e.g., PDD, ASN, ACHT, etc.) of the vendor (and optionally of the NPA-NXX), and the vendor evaluator instructions 602 may utilized the incrementally updated performance data values to generate an incrementally updated performance score 608 for the vendor (and optionally of the NPA-NXX), e.g., by executing the algorithm 605. Thus, the performance score 608 of a particular vendor (and optionally of a particular NPA-NXX) may be updated each time a call serviced by the particular vendor is released.

Such an incremental approach, may, in some cases, become computationally expensive in systems that are heavily trafficked. As such, in some embodiments, a combination of the aforementioned batch mode and incremental mode may be utilized by the system 100. For example, as calls are released, the vendor evaluator instructions 602 may temporarily store or locally cache (reference 610) respective immediate call data and/or immediate call performance data of each released call. At a shorter periodic time interval (e.g., every minute, every 30 seconds, or at some other suitable interval), and/or when the cache 610 is full, the vendor evaluator instructions 602 may re-calculate or update current performance data values (e.g., PDD, ASN, average call length) of the vendors (and optionally of the NPA-NXXs) represented in the cache 610, execute the algorithm 605 using the updated performance values, and generate updated performance scores 608 of the vendors (and optionally of the NPA-NXXs) represented in the cache 610. As such, in these embodiments, while call data records may still be historized in the historical call data records 135 of the inter-carrier switch 102, the vendor performance scores 608 may be generated, re-calculated, and/or updated based on the immediate call data records held in the local cache 610. For example, the vendor performance scores 608 may be generated, re-calculated, and/or updated based only on the immediate call data records held in the local cache 610. Alternatively, the vendor performance scores 608 may be generated, re-calculated, and/or updated based on both the immediate call data records stored in the cache 610 and based on the historical call data records 135, e.g., when the vendor performance scores 608 are determined based on call data occurring over a time interval longer than the local cache 610 is able to support in real-time.

However, the size of the cache 610 utilized by the vendor evaluator instructions 602 and/or the length of the shorter periodic time interval for analyzing the cache contents 610 may be configurable, and may be changed dynamically. For example, the size of the cache 610 and/or the length of the shorter periodic time interval may be dynamically determined and changed based on a current average call length or ACHT.

Accordingly, the vendor evaluator system 600 may cause an updated, current vendor performance map 608 (including updated, current vendor performance scores) to be made available on a real-time or near real-time basis. In particular, the updated vendor performance map 608 or updated, real-time or near real-time vendor performance scores 608 may be used by the call router 122 to determine, select or obtain a particular vendor exchange to which an incoming call is to be routed, e.g., in determining a terminating or forwarding vendor exchanges for an incoming call. For example, the updated, real-time or near real-time vendor performance scores 608 may be pushed to the call router 122 and/or retrieved by the call router 122.

A set or a pool of acceptably-performing candidate vendor exchanges 118a-118n for routing calls from the switch 102 may be determined based on the current performance scores 608. For example, a customer of the inter-carrier exchange 102 (e.g., the long distance termination provider 115 or other provider transmitting a call originating to the inter-carrier exchange 102 for delivery) may indicate that any vendor 118a-118b that services its calls must have a minimum and/or maximum current vendor performance score 608 to ensure a level of quality and/or grade of service. In some cases, a customer of the inter-carrier exchange 102 may indicate different minimum threshold scores and/or different maximum threshold scores for varying levels or quality and/or grades of call service. Based on customer performance threshold indications, and based on the current vendor performance scores 608, the call router 122 and/or the vendor evaluator instructions 602 may determine one or more acceptably-performing candidate terminating or vendor exchanges 118a-118n to which the inter-carrier exchange 102 may deliver an incoming call for termination or further routing. For example, the call router 122 may determine at least a portion of the pool of acceptably-performing candidate vendor exchanges during call set-up, and/or the vendor evaluator instructions 602 may update the pool of acceptably-performing candidate vendor exchanges while updating vendor performance scores 608. In an embodiment, all vendor exchanges 118a-118n that currently have a respective performance score 608 above a customer minimum threshold and/or below a customer maximum threshold may be included in the pool of candidate vendor exchanges to terminate, route, or forward an incoming call.

The call router 122 may select or otherwise obtain an indication of a particular vendor exchange from the pool of acceptably-performing candidate vendor exchanges. For example, the call router 122 may select the particular vendor exchange only from the pool of acceptably-performing candidate vendor exchanges. The call router 122 may select or otherwise obtain the particular vendor exchange solely based on its respective performance score 608, or the call router may select or otherwise obtain the particular vendor exchange based on its respective performance score 608 and based on one or more other criteria, such as Least Cost Routing (LCR). For example, the call router 122 may first obtain or determine a list of acceptably-performing candidate vendor exchanges for a particular customer based on comparisons of performance scores 608 and performance thresholds, and then may further whittle down the list to the particular vendor exchange based on LCR and/or other criteria such as load balancing.

As such, in light of the above discussion, with the vendor evaluator system 600, any vendor exchange 118a-118n that does not meet the quality standards of a particular customer of the inter-carrier exchange 102 at any moment in time may be excluded from servicing calls from the particular customer. For example, any vendor exchange 118a-118n that does not meet the quality standards of a particular customer of the inter-carrier exchange 102 may be excluded from a pool of candidate vendor exchanges from which the call router 122 selects a terminating exchange to terminate calls of the particular customer. Conversely, when a vendor exchange 118a-118n recovers its performance to a level of quality acceptable to the particular customer, the previously unacceptably-performing vendor exchange may be returned to the pool of acceptably-performing candidate vendor exchanges from which the call router 122 selects a terminating exchange to terminate or forward calls of the particular customer. Thus, with the vendor evaluator system 600, the system 100 may be able to easily identify, in real-time or in near real-time, significant network events and/or anomalies (e.g., that are occurring or have occurred at vendor exchanges 118a-118n, or on links between the inter-carrier exchange 102 and vendor exchanges 118a-118n) which may affect call quality and/or quality of service. Furthermore, with the vendor evaluator system 600, the system 100 may dynamically and automatically route and re-route calls to avoid affected vendor exchanges, and may restore call traffic to recovered vendor exchanges in real-time or in near real-time. Consequently, the resources of the system 100 may be utilized efficiently, as the system 100 is sensitized to vendor performance in real-time or in near real-time. Moreover, a better end-user (e.g., the calling party 105) experience is provided by the system 100. For example, the end-user may be shielded from poor call quality, as calls originated by the end-user may be serviced only by vendor exchanges 118a-118n that meet quality of service criteria.

Figure 6B:
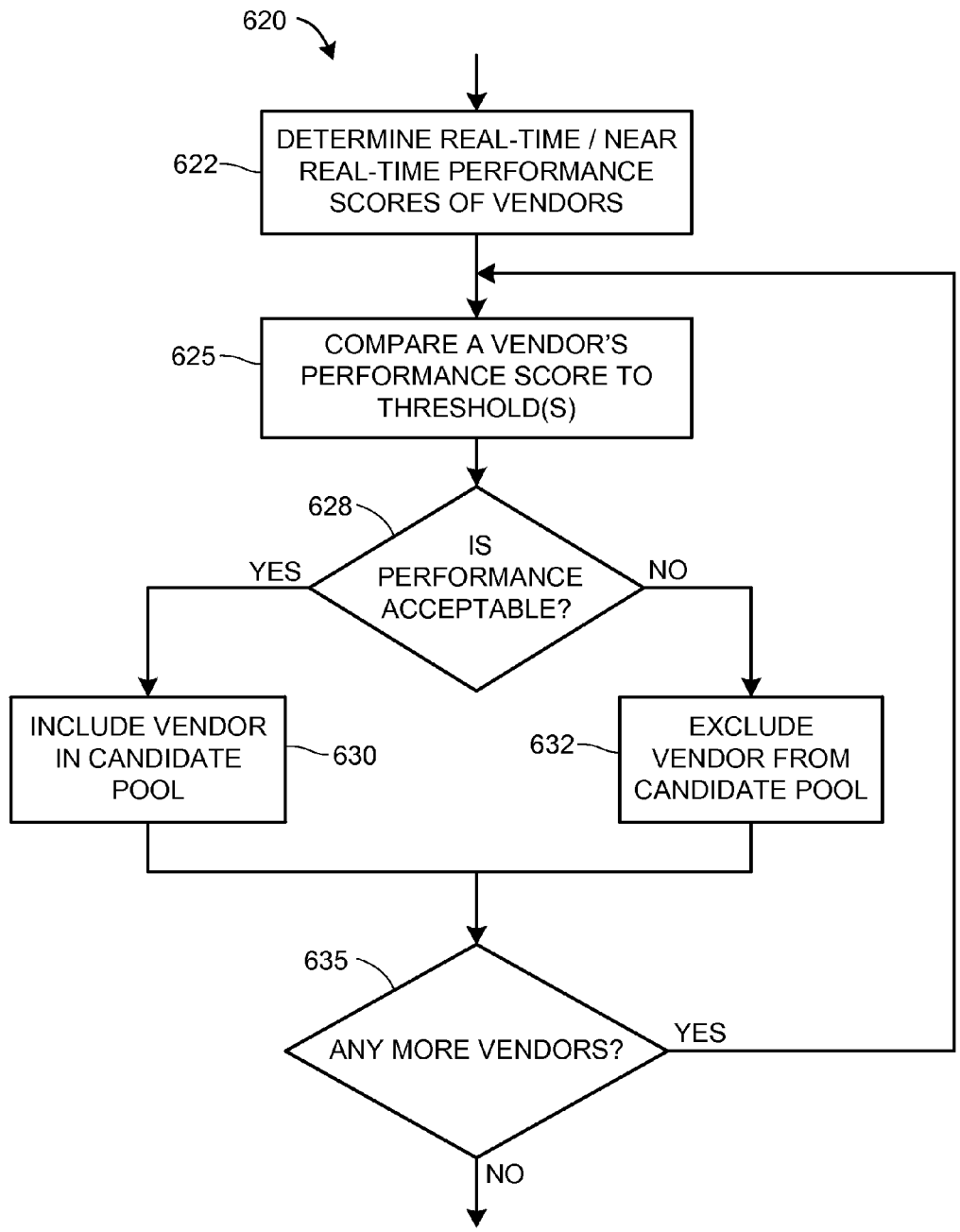
FIG. 6B is a flow diagram of an example method for delivering calls based on up-to-date, real-time or near real-time vendor performance.

FIG. 6B includes an example method 620 for delivering or terminating calls based on vendor performance. In an embodiment, the method 620 may be performed by or in conjunction with an inter-carrier switch or exchange of a communication system, such as the inter-carrier switch or exchange 102 of the system 100 of FIG. 1. For example, the method 620 may be performed at least in part by the vendor evaluator 132 of the communication system 100 of FIG. 1, by the vendor evaluator system 600 of FIG. 6A, and/or by the vendor evaluator computer-executable instructions 602 of FIG. 6A. However, while the method 620 is described below with simultaneous reference to FIGS. 1 and 6A for ease of discussion, it is understood that the method 620 may be performed by a device, apparatus or system other than the vendor evaluator 132 of FIG. 1, the vendor evaluator system 600 of FIG. 6A, or the vendor evaluator instructions 605 of FIG. 6A.

At a block 622, a respective performance score of each vendor exchange included in a plurality of vendor exchanges of a communication system may be determined. In an embodiment, the communication system includes an inter-carrier exchange 102 that receives originations from customer exchanges (e.g., from a long-distance provider exchange 115 or other originating exchange) and terminates originations via a selected vendor exchange (e.g., one of the vendor exchanges 118a-118n). Each respective performance score may be determined based on the post-dial delay (PDD), attempt-seizure ratio (ASR), and average call holding time (ACHT) of a set of calls including the calls serviced by a corresponding vendor exchange during a time interval or time period immediately preceding the initiation of the execution of the method 620. For instance, the respective performance score may be determined based on a weighted average of the PDD, ASR, and ACHT of calls serviced during the immediately preceding time interval, where the PDD is most heavily weighted. The immediately-preceding time interval may be a periodically occurring time interval, the immediately-preceding time interval may be a discrete time interval, the immediately-preceding time interval may be based on a call release, and/or the immediately-preceding time interval may be based on a point in time at which a cache of call performance data reaches a particular size. In some embodiments, a duration or a length of the time interval or time period may be configurable.

In some cases, the respective performance scores may be determined based only on the calls that were serviced (e.g., that were routed by the inter-carrier switch to a vendor exchange) during the time interval or period, and in some cases, the respective performance scores may be determined based on the calls serviced during the time interval or period as well as based additional calls that were serviced prior to the time interval or period. Generally, though, the respective performance scores may be determined in real-time or in near real-time. In an embodiment, the respective performance score may be determined by an algorithm and/or for a time period or interval such as described with respect to FIG. 6A.

Additionally, in some embodiments of the block 622, one or more respective performance scores of one or more NPA-NXX codes may be determined. For example, when one or more NPA-NXX codes are mapped to a particular vendor exchange, a respective performance score of at least some of the one or more NPA-NXX codes may be determined.

At a block 625, the method 620 may include, for a particular vendor or for a particular NPA-NXX code, comparing the performance score of the particular vendor or NPA-NXX code to one or more thresholds, e.g., one or more performance thresholds. The one or more thresholds may indicate a minimum level of performance required of a vendor exchange, and/or the one or more thresholds may indicate a maximum level of performance allowed of a vendor exchange. Different vendor exchanges (and/or different NPA-NXX codes of a same vendor exchange) may have different thresholds. In some situations, different customers of the inter-carrier switch may indicate different thresholds for a same vendor exchange, or for a same NPA-NXX code. In embodiment, at least one of the one or more performance thresholds is a preference or an indication provided by a customer of the inter-carrier network exchange 102. In an embodiment, at least one of the performance thresholds may be configurable.

At a block 628, the method 620 may include determining, based on the comparison of the block 625, whether or not the performance of the particular vendor is acceptable, e.g., whether or not the particular vendor's performance score falls within the boundaries set by the one or more performance thresholds. When the particular vendor exchange is determined, at the block 628 and based on its respective performance score, to be acceptable, the particular vendor exchange may be included in a pool of candidate vendor exchanges from which a terminating or forwarding exchange to service a call is selected, e.g., by the call router 120 (block 630). On the other hand, when the particular vendor exchange is determined, at the block 628 and based on its respective performance score, to be unacceptable or not acceptable, the particular vendor exchange may be excluded from the pool of candidate vendor exchanges from which a terminating or forwarding exchange to service a call is selected (block 632), e.g., by the call router 120 or by some other call control entity of the inter-carrier exchange 102. Each vendor exchange (and/or one or more NPA-NXX codes) may be assessed as to its performance acceptability or its performance unacceptability (blocks 635, 628, 630, 632).

In some embodiments, the method 620 may be initiated (e.g., at the block 622) periodically. In some embodiments, the method 620 may be additionally or alternatively initiated (e.g., at the block 622) on demand, e.g., per indication of a user or of another computing entity of the system 100.

Returning again to FIG. 1 and simultaneously referring to FIGS. 2-6, as previously discussed the system 100 may include any number of the efficiency features 125-132. For example, a system 100 may include any one, any two, or any three of the features 125-132, or the system 100 may include all four of the features 125-132. Further, any number of the features 125-132 (e.g., one, two, three or four of the features 125-132) may be invoked at any time, e.g., during a particular call (e.g., during the set-up and/or tear down of the call 108), or during real-time operations of the inter-carrier network exchange 102. Still further, any one of the features 125-132 may explicitly and/or implicitly interact or cooperate with any number of other features 125-132 to increase the efficiencies of the inter-carrier network exchange 102.

In an illustrative but non-limiting example of explicit cooperation between features, the Call Extender 125 may augment the real-time capabilities of the Auto-Dialer Detector 130 by providing call extending information to the Auto-Dialer Detector 130. For example, the Call Extender 125 may provide, to the Auto-Dialer Detector 130, the rates at which calls corresponding to particular ANIs are being extended. Based on the information provided by the Call Extender 125, the Auto-Dialer Detector 130 may add, to the Denied List 510, one or more ANIs having a high rate of call extension (e.g., a rate of call extension greater than a given threshold, which may be configurable), and the Auto-Dialer Detector 130 may add, to the Allowed List 512, ANIs having a low rate of call extension (e.g., a rate of call extension less than a given threshold, which may be configurable).

In an illustrative but non-limiting example of implicit cooperation between features, both the Ingress Call Filter 128 and the Auto-Dialer Detector 130 may be simultaneously applied to an inter-carrier network switch 102 to decrease unwanted traffic through the switch 102, thereby increasing capacity and performance of the switch 102 and decreasing costs. In such an example configuration, the Auto-Dialer Detector 130 may serve as a filter to block the servicing of calls from undesired call originators, while the Ingress Call Filter 128 may serve as a filter to block the servicing of calls to undesired call terminators.

Of course, other combinations of multiple efficiency features 125-132 operating simultaneously and/or cooperatively may be possible.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

What is claimed:

1. A method for detecting auto-dialed calls in real-time or near real-time, the method comprising:
   receiving, at a call router of an inter-carrier network switch communicatively connected to a data storage device storing call data records (CDRs) and to a plurality of terminating exchanges, an indication of an incoming call received at the inter-carrier network switch and including an Automatic Number Identification (ANI);
   based on the reception of the indication of the incoming call, (i) causing an indication of a call attempt corresponding to the ANI to be stored in a cache, and (ii) determining an ending time of a sliding window of time, the sliding window having a duration that is configurable based on one or more of a time of day, a date, a customer of the inter-carrier network switch, or a user input;
   determining, by the call router, whether to allow or to deny incoming calls from the ANI based on a number of call attempts corresponding to the ANI that have been received at the intercarrier network switch during the sliding window of time as indicated by contents of the cache, the number of call attempts corresponding to the ANI and to a plurality of called telephone numbers;
   when incoming calls from the ANI are determined to be allowed, processing the incoming call, based on a real-time analysis of contents of the cache performed during a call flow of the incoming call, through a Private Packet Network Backbone Exchange (PPNBE) of the inter-carrier network switch to a particular terminating exchange of the plurality of terminating exchanges, the particular terminating exchange corresponding to a called party indicated by the incoming call, and causing a call data record for the incoming call to be stored in the data storage device; and
   when incoming calls from the ANI are determined to be denied, not processing the incoming call through the PPNBE to any terminating exchange.

2. The method of claim 1, wherein causing the indication of the call attempt corresponding to the ANI to be stored in the cache comprises causing the indication of the call attempt corresponding to the ANI to be stored by the call router in the cache.

3. The method of claim 1, wherein:
   determining whether to allow or deny incoming calls from the ANI based on the contents of the cache comprises obtaining an indication from an auto-dialer detector of whether to allow or deny the incoming call; and
   the auto-dialer detector determines a content of the indication of whether to allow or deny the incoming call based on the number of call attempts corresponding to the ANI and to the plurality of called telephone numbers that have been received at the inter-carrier network switch during the sliding window of time as indicated by the contents of the cache.

4. The method of claim 1,
   further comprising determining, by the call router, whether to allow or deny the incoming call based on whether or not the ANI is included on at least one of an allowed ANI list or a denied ANI list, the allowed ANI list and the denied ANI list each indicating whether or not to allow or deny calls irrespective of the contents of the cache; and wherein determining, by the call router, whether to allow or deny the incoming call based on the contents of the cache comprises determining, by the call router, whether to allow or deny the incoming call based on the contents of the cache when the ANI is not included on the at least one of the allowed ANI list or the denied ANI list.

5. The method of claim 1, further comprising providing alternate treatment for the incoming call when incoming calls from the ANI are determined to be denied, the alternate call treatment including at least one of rejecting the incoming call, causing the incoming call to be re-routed, ignoring the incoming call, or dropping the incoming call.

6. The method of claim 1, wherein causing the indication of the call attempt corresponding to the ANI to be stored in the cache comprises causing a code, a flag, a tag, an entry, or another identifier corresponding to the ANI to be created or updated in the cache.

7. The method of claim 1, wherein a duration of the sliding window of time is configurable.

8. An auto-dialer detector, comprising:
a communicative connection to a call router included in an inter-carrier network switch; and
computer-readable instructions that are stored on a non-transitory, tangible computer-readable storage medium and that, when executed by one or more processors, cause the autodialer detector to:
  receive, via the communicative connection to the call router, an indication that a call attempt has been received at the inter-carrier network switch, the call attempt indicating a particular Automatic Number Identification (ANI);
  determine, based on a time of receipt of the indication of the call attempt indicating the particular ANI, an endpoint of a sliding window of time, the sliding window having a duration that is configurable based on one or more of a time of day, a date, a customer of the inter-carrier network switch, or a user input;
  determine, based on the sliding window of time and contents of a cache accessible to the auto-dialer detector, whether to allow or deny routing, using the inter-carrier network switch, incoming calls from the particular ANI, the contents of the cache indicative of call attempts, corresponding to the particular ANI and to a plurality of called telephone numbers, that have been received at the inter-carrier network switch during the sliding window of time;
  when the routing of incoming calls from the particular ANI is determined to be allowed, provide, to the call router, an allow indication indicating that the call attempt is to be processed through a Private Packet Network Backbone Exchange (PPNBE) of the inter-carrier network switch to a particular terminating exchange of a plurality of terminating exchanges to which the inter-carrier network switch is communicatively connected, thereby causing a call data record (CDR) for the call attempt to be stored in a call data record data storage entity communicatively connected to the inter-carrier network switch;
  when the routing of incoming calls from the particular ANI is determined to be denied, provide, to the call router, a deny indication indicating that the call attempt is not to be processed through the PPNBE of the inter-carrier network switch to any terminating exchange; and
  update the contents of the cache in response to the reception of the indication of the call attempt indicating the particular ANI.

9. The auto-dialer detector of claim 8, further comprising at least one of an allowed ANI list or a denied ANI list, and wherein:
  a determination of whether to allow or deny the routing of the call attempt for the particular ANI is further based on whether or not the particular ANI is included on the at least one of the allowed ANI list or the denied ANI list; and
  an inclusion of one or more ANIs on the at least one of the allowed ANI list or the denied ANI list supersedes the determination of whether to allow or deny routing of incoming calls from the particular ANI based on the contents of the cache.

10. The auto-dialer detector of claim 9, wherein at least one of the ANIs included on the at least one of the allowed ANI list or the denied ANI list is based on a user input.

11. The auto-dialer detector of claim 8, wherein the determination of whether to allow or deny the routing of incoming calls from the particular ANI based on the contents of the cache is based on a pattern analysis of the contents of the cache performed in real-time by the auto-dialer detector upon the receipt of the indication of the call attempt indicating the particular ANI.

12. The auto-dialer detector of claim 11, wherein:
  the pattern analysis of the contents of the cache comprises a determination of a total number of call attempts corresponding to the particular ANI and to the plurality of called telephone numbers that have been received by the inter-carrier switch during the sliding window of time; and
  the auto-dialer detector provides the deny indication of the call attempt for the particular ANI when the total number of call attempts corresponding to the particular ANI and to the plurality of called telephone numbers within the sliding window of time is greater than a threshold.

13. The auto-dialer detector of claim 12, wherein at least one of: the sliding window of time has a pre-determined length, or at least one of the threshold or the pre-determined length is configurable.

14. The auto-dialer detector of claim 8, wherein the update to the contents of the cache comprises a creation of or an update to a code, a flag, a tag, an entry, or another identifier corresponding to the ANI.

15. A system for detecting auto-dialed calls, the system comprising:
  a cache configured to store an indication of a respective number of call attempts for each of one or more Automatic Number Identifications (ANIs) included in one or more calls that have been received at an inter-carrier network switch during a sliding window of time, the inter-carrier network switch including a Private Packet Network Backbone Exchange (PPNBE) through which incoming calls are processed to a plurality of terminating exchanges, the sliding window having an end time that is determined based on a time of reception of a most recently received incoming call at the inter-carrier network switch, and the sliding window having a duration that is configurable based on one or more of a time of day, a date, a customer of the inter-carrier network switch, or a user input;

an auto-dialer detector configured to update the respective number of call attempts for the each of the one or more ANIs included in the one or more calls that have been received at the inter-carrier network switch during the sliding window of time and that correspond to a plurality of called telephone numbers; and a call router included in the inter-carrier network switch and configured to process each incoming call included in a plurality of incoming calls using the PPNBE based on a respective real-time analysis of contents of the cache performed during a respective call flow of the each incoming call.

16. The system of claim 15, wherein:

the call router is configured to route an incoming call including a particular ANI through the PPNBE to a respective terminating exchange when the real-time analysis of the contents of the cache indicate that calls including the particular ANI are to be processed by the inter-carrier network switch to the plurality of terminating exchanges; and the call router is further configured to not route the incoming call including the particular ANI through the PPNBE to any terminating exchange and to provide alternate call treatment to the incoming call when the real-time analysis of the contents of the cache indicate that calls including the particular ANI are not to be processed by the inter-carrier network switch to any terminating exchange.

17. The system of claim 16, wherein the alternate call treatment includes at least one of: a rejection of the incoming call, a drop of the incoming call, an ignoring of the incoming call, or a re-routing of the incoming call.

18. The system of claim 17, wherein the alternate call treatment is configurable.

19. The system of claim 16, wherein the inter-carrier network switch is communicatively connected to a data storage device storing call detail records (CDRs), and wherein the call router causes a call data record corresponding to the incoming call to be stored in the data storage device in conjunction with routing of the incoming call through the PPNBE to the respective terminating exchange.

20. The system of claim 15, wherein the auto-dialer detector is further configured to perform the real-time analysis of the contents of the cache and to provide an indication of a result of the real-time analysis to the call router.

21. The system of claim 15, wherein a length of the sliding window of time is configurable based on at least one of a time of day, a date, a customer of the inter-carrier network switch, or a user input.

22. The system of claim 15, wherein the length of the sliding window of time is less than five minutes.

23. The system of claim 15, wherein at least one of the call router, the auto-dialer detector, or the cache is included in the PPNBE.

* * * * *